US008705057B2

(12) United States Patent
Fukuoka et al.

(10) Patent No.: US 8,705,057 B2
(45) Date of Patent: Apr. 22, 2014

(54) IMAGE PROCESSING APPARATUS, METHOD FOR DISPLAYING INTERFACE SCREEN, AND COMPUTER-READABLE STORAGE MEDIUM FOR COMPUTER PROGRAM

(75) Inventors: Kaoru Fukuoka, Toyokawa (JP); Shoji Imaizumi, Shinshiro (JP); Yoichi Kurumasa, Toyokawa (JP); Kana Kodama, Anjo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 154 days.

(21) Appl. No.: 13/161,230

(22) Filed: Jun. 15, 2011

(65) Prior Publication Data

US 2011/0317192 A1 Dec. 29, 2011

(30) Foreign Application Priority Data

Jun. 24, 2010 (JP) ................................ 2010-144275

(51) Int. Cl.
*G06F 3/048* (2013.01)

(52) U.S. Cl.
USPC .......... 358/1.13; 715/783; 715/784; 715/788; 715/793; 715/810; 715/973; 715/835; 715/830; 399/81; 345/684; 345/687

(58) Field of Classification Search
USPC ............ 399/81; 715/783–787, 973, 830, 788, 715/793, 810, 835; 358/1.1–1.16; 345/684, 345/687
See application file for complete search history.

(56) References Cited

U.S. PATENT DOCUMENTS

| 5,497,455 | A  | * | 3/1996 | Suga et al. ..................... 715/835 |
| 7,437,005 | B2 | * | 10/2008 | Drucker et al. ............... 382/224 |
| 7,551,188 | B2 | * | 6/2009 | Ahokas ......................... 345/684 |
| 2008/0037042 | A1 |   | 2/2008 | Furuichi et al. |
| 2008/0155461 | A1 |   | 6/2008 | Ozaki |

(Continued)

FOREIGN PATENT DOCUMENTS

| JP | 7-321967  | 12/1995 |
| JP | 2004-29292 | 1/2004 |

(Continued)

OTHER PUBLICATIONS

Notification of Reasons for Refusal dated Apr. 17, 2012, directed to Japanese Application No. 2010-144275; 8 pages.

*Primary Examiner* — Twyler Haskins
*Assistant Examiner* — Dennis Dicker
(74) *Attorney, Agent, or Firm* — Morrison & Foerster LLP

(57) ABSTRACT

An image processing apparatus having a plurality of functions includes a scroll display portion that displays a row of markers and a slider for specifying one or more markers sequentially by moving along the row, an image display portion that displays functional images for representing functions corresponding to the markers specified by the slider, a setting portion that receives setting item details for a function specified by one of the functional images selected, and an extraction portion that extracts a function having the setting item details received by the setting portion different from an initial value. The image display portion displays a functional image for a longer time when the functional image represents the function extracted by the extraction portion than when the functional image does not represent the function extracted by the extraction portion.

24 Claims, 16 Drawing Sheets

(56) References Cited

U.S. PATENT DOCUMENTS

| | | |
|---|---|---|
| 2008/0297536 A1* | 12/2008 | Matsuno et al. .............. 345/684 |
| 2009/0271723 A1 | 10/2009 | Matsushima et al. |
| 2010/0017732 A1 | 1/2010 | Matsushima et al. |
| 2010/0058240 A1 | 3/2010 | Bull et al. |
| 2010/0164991 A1* | 7/2010 | Watanabe et al. .............. 345/635 |
| 2010/0194706 A1* | 8/2010 | Watanabe et al. .............. 345/173 |
| 2011/0234641 A1* | 9/2011 | Sasaki ........................... 345/672 |
| 2013/0246973 A1* | 9/2013 | Tomiyasu et al. .............. 715/830 |

FOREIGN PATENT DOCUMENTS

| | | |
|---|---|---|
| JP | 2008-42634 | 2/2008 |
| JP | 2008-157974 | 7/2008 |
| JP | 2009-265929 | 11/2009 |
| JP | 2009-289101 | 12/2009 |
| WO | WO-2010/024969 | 3/2010 |

* cited by examiner

FIG. 9
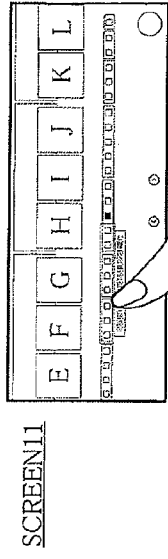 SCREEN01
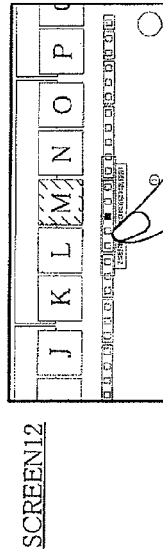 SCREEN02
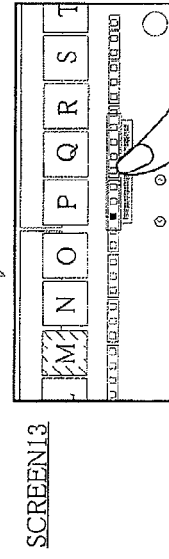 SCREEN03
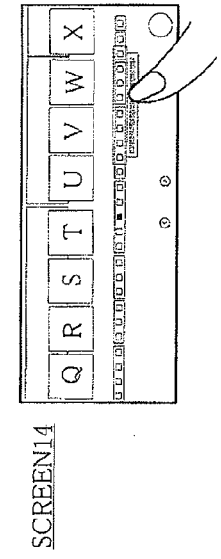 SCREEN04
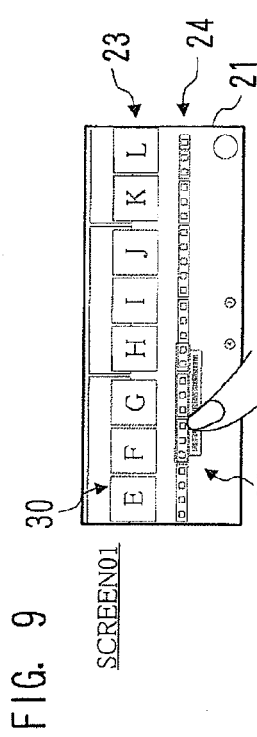 SCREEN11
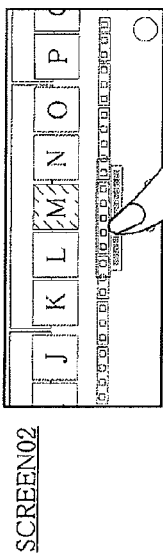 SCREEN12
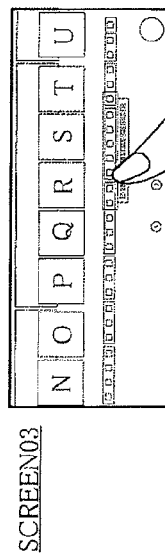 SCREEN13
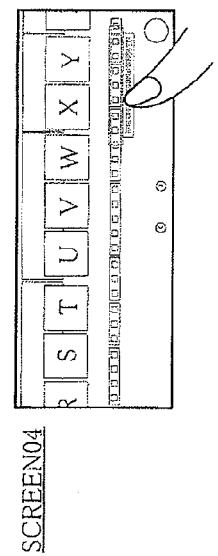 SCREEN14

FIG. 12

| | | ITEMS 1712 | ITEMS 1713 | | ITEMS 1714 | |
|---|---|---|---|---|---|---|
| SET NUMBER 1711 | SETTING DETAILS | ICON IDENTIFIER | SETTING DETAILS | ICON IDENTIFIER | SETTING DETAILS | ICON IDENTIFIER |
| 1 | SEPARATE | BOOK ORIGINAL | CENTERING | IMAGE SHIFT | NON-IMAGE AREA ERASE | ERASE |
| 2 | DOUBLE-SIDED | DOCUMENT SETTINGS | N-IN-1 | CONTINUOUS READING | MAGNIFICATION | HOW TO CONTAIN IMAGE IN PAGE |
| 3 | TWO-POSITION STAPLING | BOOK ORIGINAL | MID-FOLDING | COVER SHEET | — | — |
| 4 | SEPARATE | BOOK ORIGINAL | YES | MIRROR IMAGE | — | — |
| ... | ... | ... | ... | ... | ... | ... |

IMAGE PROCESSING APPARATUS, METHOD FOR DISPLAYING INTERFACE SCREEN, AND COMPUTER-READABLE STORAGE MEDIUM FOR COMPUTER PROGRAM

This application is based on Japanese patent application No. 2010-144275 filed on Jun. 24, 2010, the contents of which are hereby incorporated by reference.

BACKGROUND OF THE INVENTION

1. Field of the Invention

The present invention relates to an operational panel equipped in an image processing apparatus or the like.

2. Description of the Related Art

Functions of copiers have recently been expanded. Multi-Function Peripherals (MFP's) configured to integrate, thereinto, a variety of functions such as faxing and printing have become the mainstream of copiers installed in offices.

Expanding functions of an MFP brings convenience to users because they can operate only one MFP to use many functions thereof. On the other hand, expanding functions of an MFP often makes the operation thereof complicated. To be specific, since the size of an operational panel of the MFP is limited, it is difficult to display, at one time, letters, diagrams, and the like representing all the available functions and setting items thereof in such a manner that users can easily recognize the indication on the operational panel.

In such a case, the operational flexibility of the MFP is improved by using a Graphical User Interface (GUI), hereinafter called an "interface", configured to display setting screens by switching from one setting screen to another. The operational flexibility of the MFP is also improved by using an interface or the like for providing a scrolled display in which letters and the like that do not fit on a screen are displayed by scrolling through the letters vertically or horizontally across the screen.

Further, improvement in function of an MFP enables the MFP to perform sophisticated printing or copying such as N-in-1 copy and binding copy. On the other hand, such improvement often complicates a setting method for the sophisticated printing or copying. In the case, for example, where a user changes a setting value of a certain item, a setting value of another item is sometimes changed automatically in conjunction with the change of the setting value by the user.

In such a case, the user usually does not recognize that an item other than the item changed by him/her has been changed automatically. Even if he/she recognizes the automatic change, it takes an amount of time and energy to find out which item has been changed automatically.

Further, along with the expansion in functions of an MFP, an item to be set by the user increases. Thus, it sometimes takes an amount of time and energy to find out not only an item automatically changed by the MFP but also an item to which the user has made a change.

As for an interface for providing a scrolled display, the user can see all images for a short time if scroll speed is increased and the number of images to be displayed per unit time is increased. However, if a period of time during which images are displayed is too short, the user possibly overlooks a target image and looks for the target image by scrolling backward, which sometimes ends up taking a large amount of time and energy.

To cope with this, there has been proposed a technique in which, if the number of images displayed per unit time excesses a predetermined value, the display size of an image is reduced (see Japanese Laid-open Patent Publication No. 2009-289101).

Unfortunately, in the technique, visibility of an image displayed is sometimes reduced because the display size of the image is reduced. Reduction in visibility results in increase in work for finding out a target image.

SUMMARY

The present disclosure is directed to solve the problems pointed out above, and therefore, an object of an embodiment of the present invention is to provide an image processing apparatus equipped with a user interface function configured to easily find out an item desired by a user in an interface for providing a scrolled display.

According to an aspect of the present invention, an image processing apparatus having a plurality of functions, including a scroll display portion that displays a scroll track and a slider, the scroll track being an image in which display areas corresponding to the plurality of functions are successively placed, the slider being an image for specifying a partial area of the scroll track sequentially by moving along the scroll track, an image display portion that displays functional images specified by the slider, the functional images being images representing the plurality of functions corresponding to the display areas contained in the partial area of the scroll track, a setting portion that receives setting item details for a function specified by one of the functional images selected by a user, and an extraction portion that extracts a function having the setting item details received by the setting portion different from an initial value. The image display portion displays a functional image for a longer time when the functional image represents the function extracted by the extraction portion than when the functional image does not represent the function extracted by the extraction portion.

These and other characteristics and objects of the present invention will become more apparent by the following descriptions of preferred embodiments with reference to drawings.

BRIEF DESCRIPTION OF THE DRAWINGS

FIG. 9 is a diagram showing the comparison between the screens of FIG. 7 and the screens of FIG. 8 in a chronological order.

FIG. 12 is a diagram showing an example of the structure and details of a related icon management table.

DESCRIPTION OF THE PREFERRED EMBODIMENTS

[Embodiments]

Descriptions are provided below of a user interface function equipped in an image processing apparatus according to the present invention. In the embodiments, descriptions are given of a user interface function equipped in an MFP 1000, which is one type of the image processing apparatus, with reference to drawings. The image processing apparatus is not limited to an MFP (multifunction device), and may be a stand-alone device having functions of scanning, faxing, printing, and the like.

Figure 1:
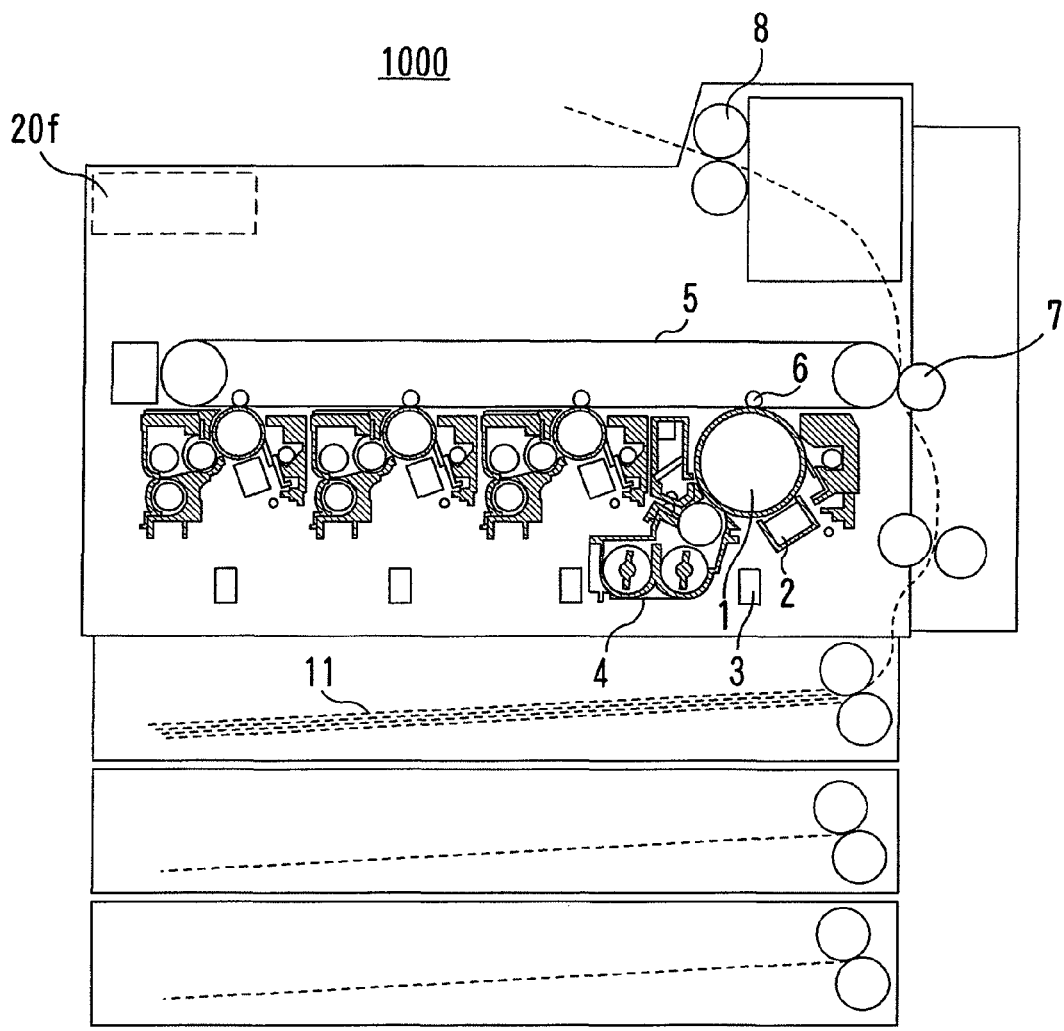
FIG. 1 is an overall schematic diagram of an MFP.

FIG. 1 is an overall schematic diagram of the MFP 1000.

The MFP 1000 is provided with an operational panel 20f by means of which the user interface function is implemented. The MFP 1000 controls units as discussed below depending on items specified by a user through the operational panel 20f, and performs printing or the like in accordance with a request made by the user.

The MFP 1000 includes an image forming unit for forming a black (K) image. The image forming unit is provided with an image carrier 1 called a photoconductor drum, a charging device 2 for charging the surface of the image carrier 1 at a uniform potential, an image exposure device 3 for applying light to the surface of the charged image carrier 1 and forming a predetermined electrostatic latent image, and a developing device 4 for developing by electrostatically adsorbing toner, which is a powdered color material, in an area where the electrostatic latent image is formed. An image forming unit for forming images of yellow (Y), magenta (M), and cyan (c) has a structure similar to that of the image forming unit for forming a black (K) image.

The MFP 1000 also includes a primary transfer device 6 for transferring (primary transferring of) the toner developed on the surface of the individual image carriers 1 onto a transfer belt 5 as an intermediate transfer belt, a secondary transfer device 7 for transferring (secondary transferring of) the toner, which has been primarily transferred onto the transfer belt 5, onto a recoding medium 11 such as recording paper or a resin film, and a fusing unit 8 for fixing the toner which has been secondarily transferred onto the recording medium 11.

Figure 2:
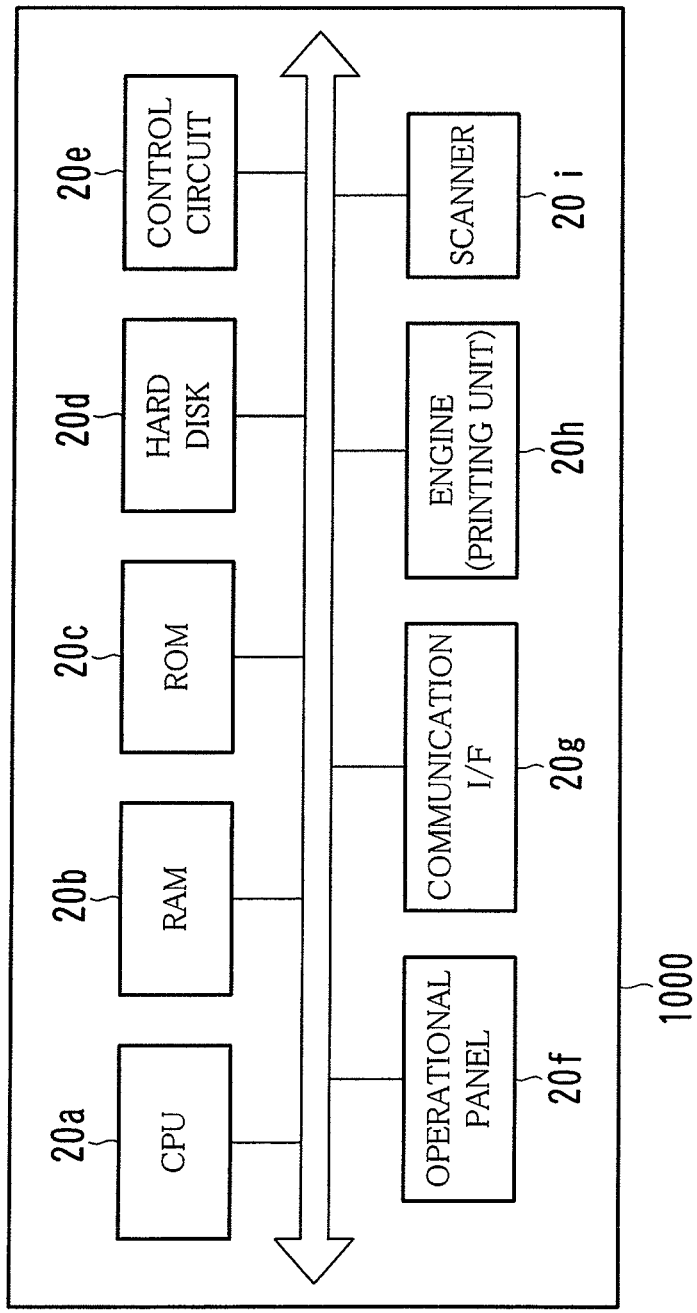
FIG. 2 is a diagram showing an example of the hardware configuration of an MFP.

FIG. 2 is a diagram showing an example of the hardware configuration of the MFP 1000.

The MFP 1000 is configured of a Central Processing Unit (CPU) 20a, a Random Access Memory (RAM) 20b, a Read-Only Memory (ROM) 20c, a hard disk 20d, a control circuit 20e, an operational panel 20f, a communication interface (I/F) 20g, a printing unit 20h, a scanner 20i, and so on.

The control circuit 20e is a circuit for controlling the hard disk 20d, the operational panel 20f, the communication interface 20g, the printing unit 20h, the scanner 20i, and so on.

The operational panel 20f is provided with a touch-sensitive panel, and is operable to display, for example, a screen for giving a message or the like to a user, a screen for the user to enter desired processes or the like. The user can make desired settings on the MFP 1000 by touching a predetermined position of the touch-sensitive panel.

The communication interface 20g is a Network Interface Card (NIC) for communicating with another device such as an authentication server and a user terminal, both of which are not shown, according to Transmission Control Protocol/Internet Protocol (TCP/IP) via a communication line, or a modem.

The printing unit 20h serves to print, onto paper, an image based on image data stored in a memory, e.g., the RAM 20b or the hard disk 20d, or image data transmitted by the user terminal and the like.

The scanner 20i is a so-called image scanner, and is operable to scan a diagram and a photograph printed on paper and to store the image, as image data, into the memory of the MFP 1000. The MFP 1000 implements a copy function by causing the scanner 20i to scan an image on a document and causing the printing unit 20h to print an image based on the scanned image.

[Operational Panel and Scroll Screen]

Descriptions are provided below of an example of the configuration of the operational panel 20f and display made thereon with reference to FIGS. 3 and 4. The descriptions are given with reference to display made on the operational panel 20f for a case where a COPY key 22c (see FIG. 3) of an operational key portion 22, described later, is pressed.

The operational panel 20f is configured of a touchscreen portion 21 and the operational key portion 22.

The touchscreen portion 21 is a touch-sensitive panel and is operable to display a screen for informing a user of the state of the MFP 1000, a screen for the user to give a command to the MFP 1000 by touching the touch-sensitive panel with his/her finger, and the like.

A plurality of functional icons 30 that seem like badges are displayed on the touchscreen portion 21. In FIG. 3, eight functional icons 30 are displayed thereon.

The functional icons 30 are images indicating functions of the MFP 1000. One functional icon 30 corresponds to one function of the MFP 1000. The functional icon 30 includes a function type 301, an illustration 302, and an item detail 303. The function type 301 represents the name of a function corresponding to the functional icon 30. The illustration 302 is to help a user to visually recognize a function corresponding to the functional icon 30. The item detail 303 indicates a current setting value (item details) set for a function corresponding to the functional icon 30. The user touches the functional icon 30, thereby to set the item details (operational conditions) of the corresponding function. There are provided, for example, two methods for setting item details. One of the methods is to make settings by touching the functional icon 30 to switch between "ON" and "OFF". The other is to set operational conditions on another screen for conditions setting displayed by touching the functional icon 30. The screen for conditions setting corresponds to an item setting screen described later.

As for the case of the functional icon 30 indicating "book original", for example, setting items "separate", "spreading direction", and the like that are items relating to the function are set as the operational conditions. Hereinafter, the setting items are sometimes called "items of the functional icon 30" simply.

An area of the touchscreen portion 21 displaying the functional icons 30 is herein referred to as a functional icon area 23. A part of all the functional icons 30 of the MFP 1000, i.e., in FIG. 3, eight of the functional icons 30 such as "book original" and "continuous reading" are displayed in the functional icon area 23.

A scroll track 24 and a slider 25 are displayed below the functional icon area 23.

Figure 4:
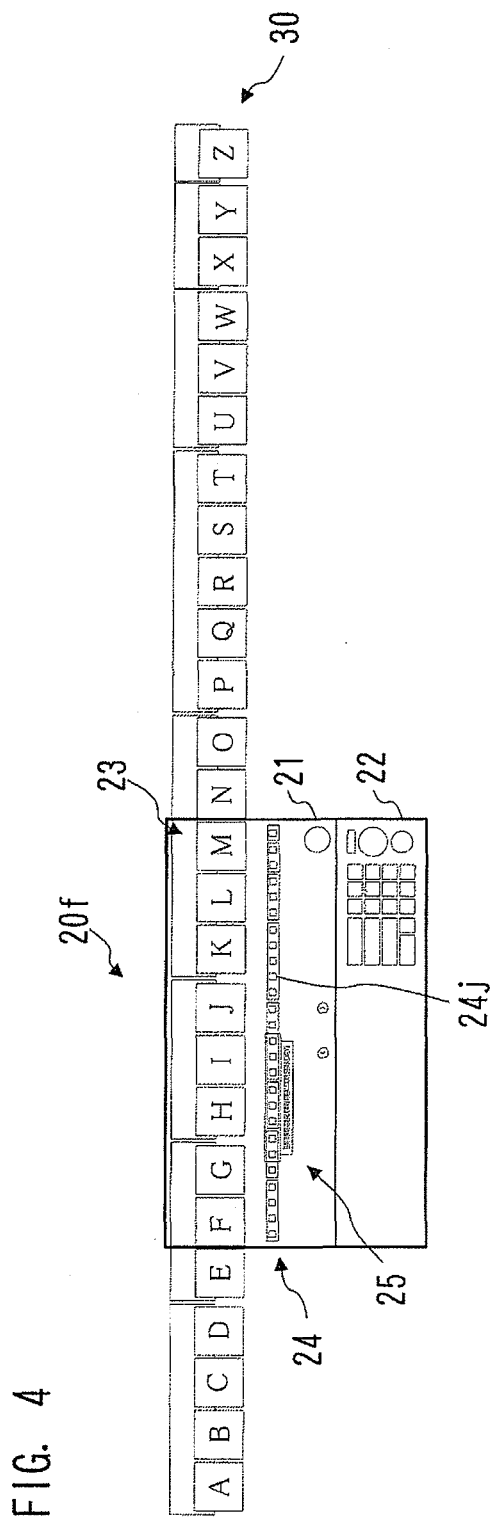
FIG. 4 is a diagram showing an example of the relationship between functional icons, a functional icon area, a scroll track, and a slider.

FIG. 4 is a diagram showing an example of the relationship between all the functional icons 30, the functional icon area 23, the scroll track 24, and the slider 25.

In FIG. 4, it is assumed that the MFP 1000 includes twenty-six functional icons 30 from a functional icon 30A through a functional icon 30Z for the sake of convenience.

Referring to FIG. 4, eight consecutive functional icons 30 out of the twenty-six functional icons 30A-30Z are displayed in the functional icon area 23. A user moves the slider 25 to specify which of the functional icons 30 are displayed therein.

A plurality of markers are disposed horizontally in the scroll track 24. The markers are icons, and the number of markers is the same as that of functional icons 30. Starting from the left, the markers correspond to functional icons 30A, 30B, . . . 30Z.

The slider 25 moves along the scroll track 24, and specifies eight markers on the scroll track 24 by enclosing the eight markers by a rectangle. Stated differently, functional icons 30 corresponding to the eight markers specified by the slider 25 are displayed in the functional icon area 23.

Moving the slider 25 along the scroll track 24 without releasing the slider 25 (hereinafter also called dragging the slider 25) displays functional icons 30 corresponding to the markers specified by the slider 25 in order on the functional icon area 23. In short, the functional icons 30 are scroll-displayed. Hereinafter, such a screen displayed on the touchscreen portion 21 of FIG. 3 is referred to as a "scroll screen".

Figure 3:
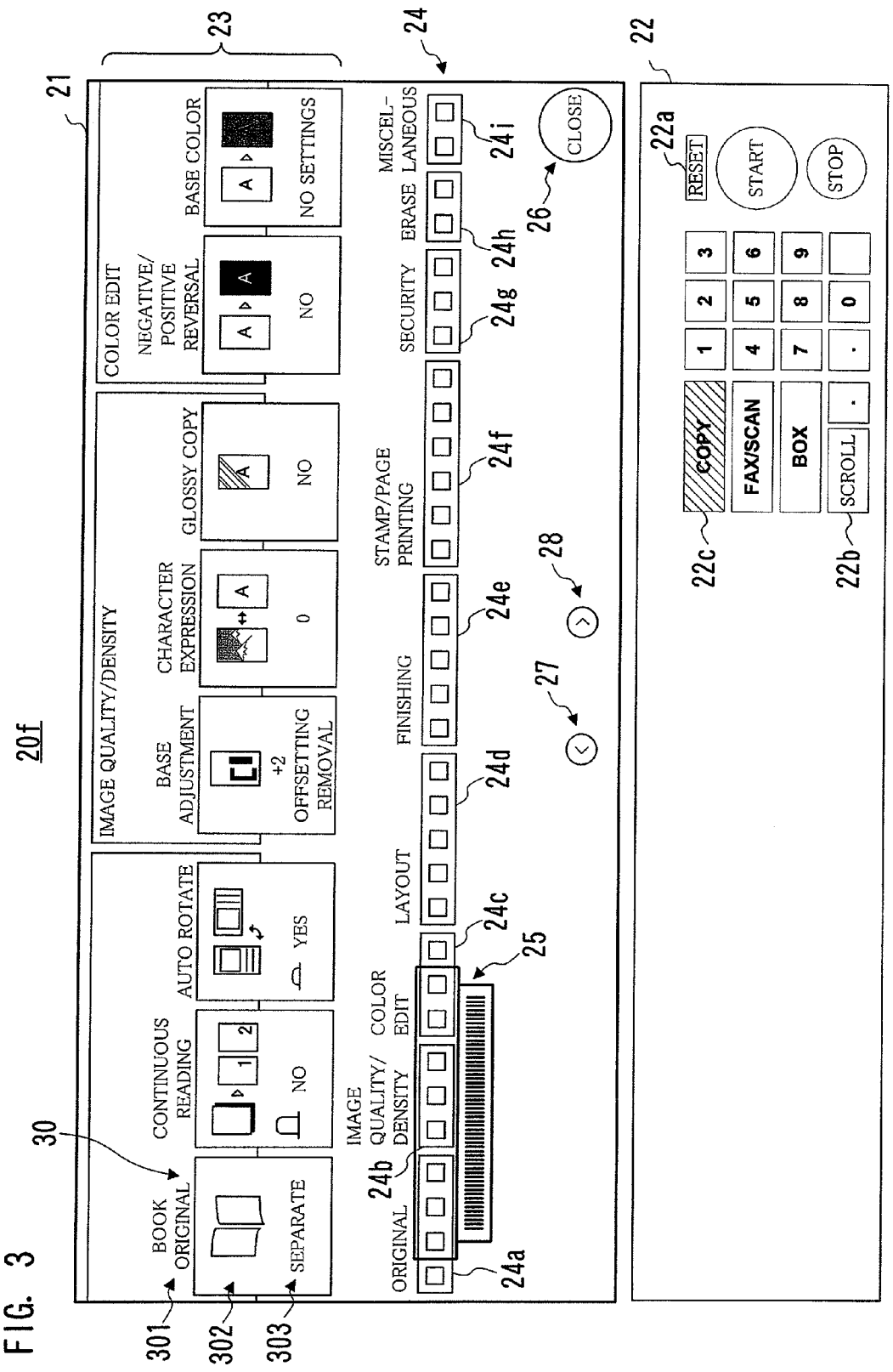
FIG. 3 is a diagram showing an example of the configuration of an operational panel and a display example thereon.

A CLOSE button 26 of FIG. 3 is to give a command to close the scroll screen.

A left scroll arrow button (denoted by "<") 27 is to give a command to move the slider 25 to the left in units of functional groups. Here, the functional groups mean groups made by classifying the functional icons 30 depending on the function type. Referring to FIG. 3, nine functional groups are shown from original 24a, image quality/density 24b . . . , to miscellaneous 24i. Each of the functional groups is shown as a rectangle surrounding markers corresponding to functional icons 30 constituting the subject functional group.

A right scroll arrow button (denoted by ">") 28 is to give a command to move the slider 25 to the right in units of functional groups.

The operational key portion 22 is provided with hard keys by means of which the user gives the MFP 1000 a command to perform basic functions thereof such as copying or faxing. The hard keys are, for example, a RESET key 22a by means of which a command to reset item details of the functional icons 30 is given, a SCROLL key 22b by means of which a command to display the scroll screen on the touchscreen portion 21 is given, a COPY key 22c used to specify a copy process, and a numeric keypad. The operational key portion 22 has functions only to receive commands from the user.

Another configuration is possible in which the hard keys of the operational key portion 22 are displayed on the touchscreen portion 21.

[Functions]

Figure 5:
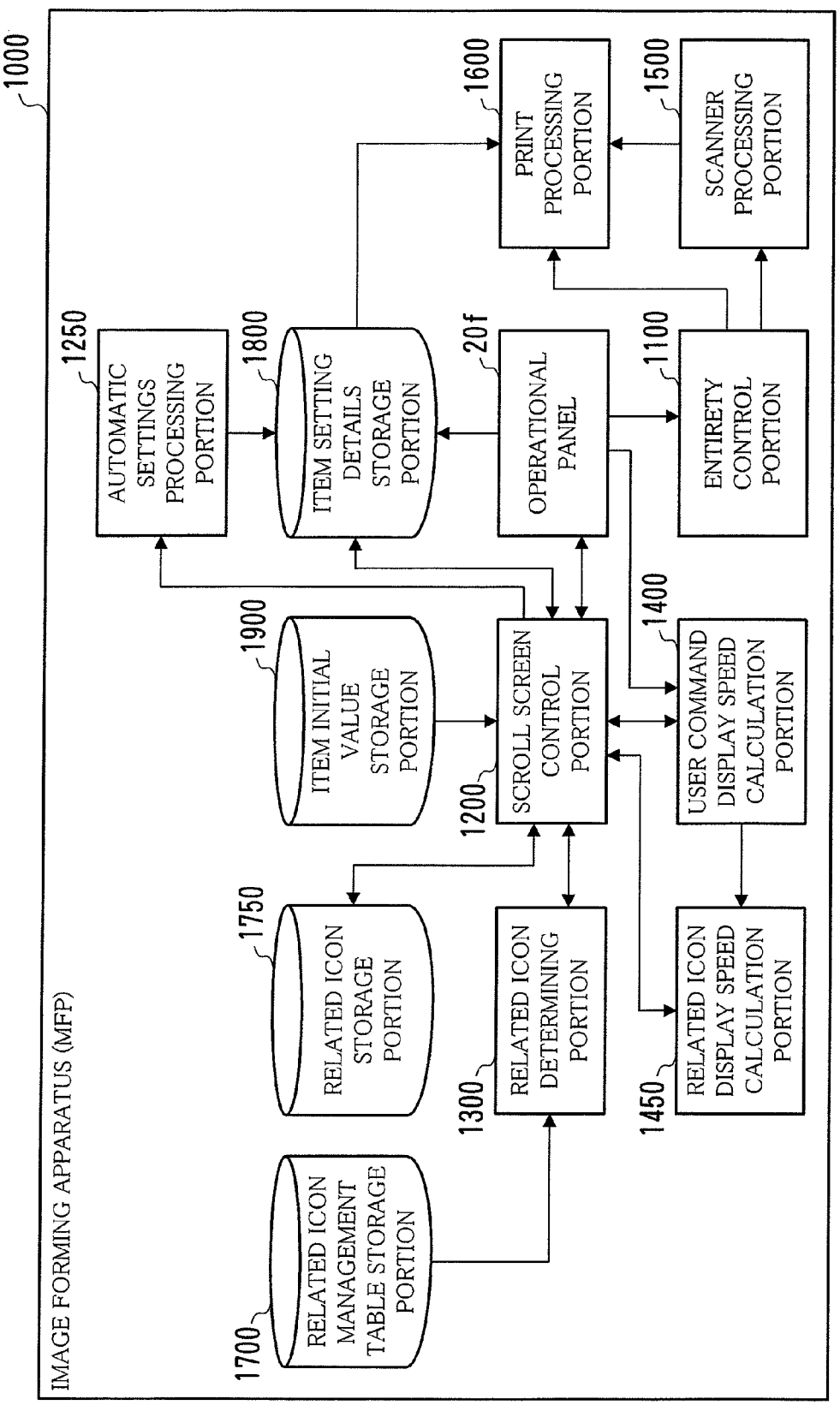
FIG. 5 is a diagram showing an example of the functional configuration of an MFP.

Descriptions are provided below of the user interface function of the MFP 1000 with reference to FIGS. 6-11, prior to giving descriptions of the functional configuration of the MFP 1000 (FIG. 5).

Figure 6:
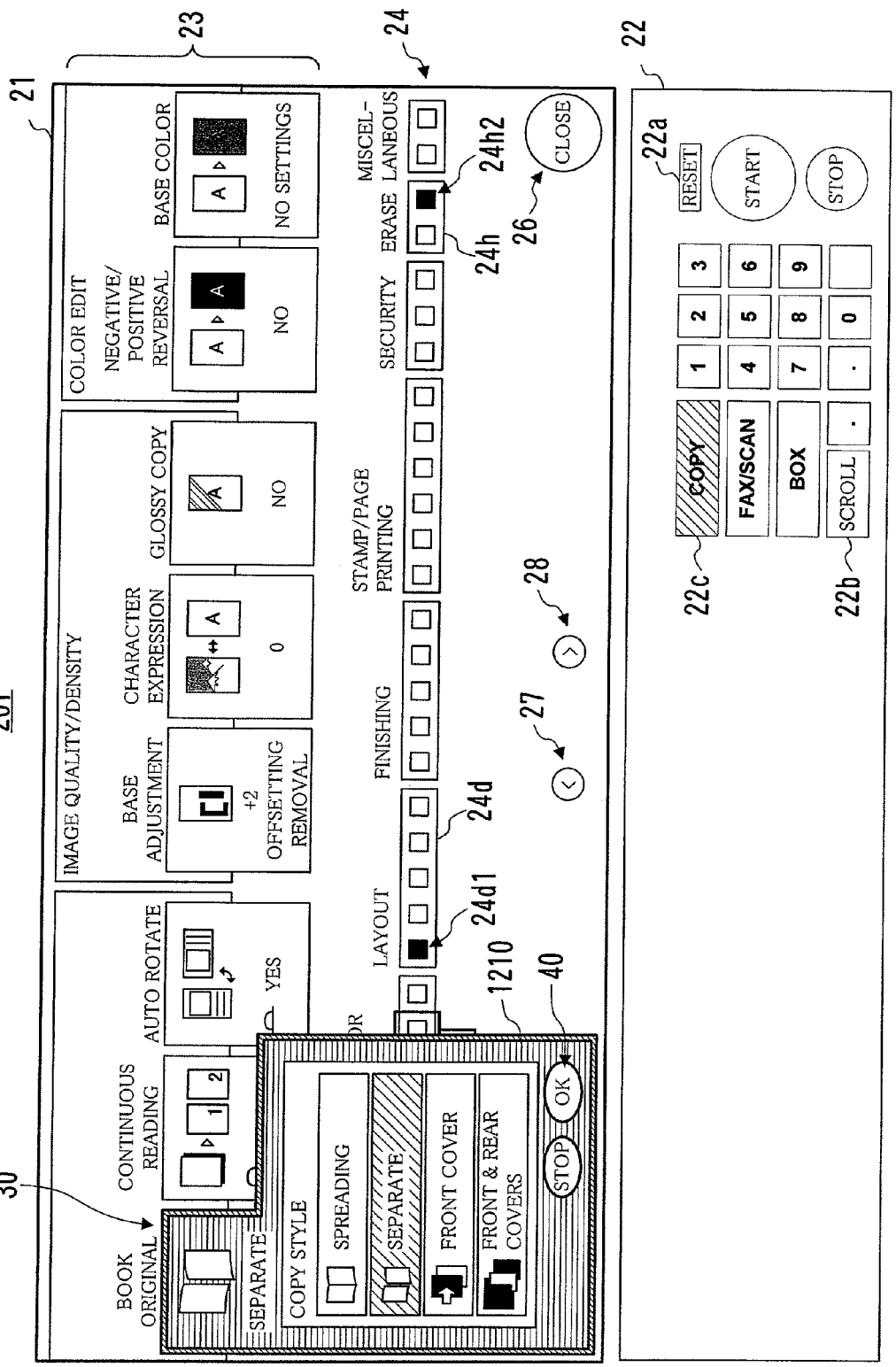
FIG. 6 is a diagram showing an example of a screen on which item settings for a functional icon named "book original" are made.

FIG. 6 shows a screen displayed when the functional icon 30 for "book original" is touched on the scroll screen of FIG. 3. When the functional icon 30 "book original" is touched, a screen is displayed for item settings for the "book original" function. Such a screen is hereinafter called an "item setting screen".

For example, the user specifies the item "separate" on the item setting screen 1210 (see the hatched part). In response to this operation, the MFP 1000 automatically enables the item "centering" of the functional icon 30 "image shift" of the functional group 24d "layout", and the item "non-image area erase" of the functional icon 30 "erase". In FIG. 6, a marker 24d1, which corresponds to the functional icon 30 "image shift", and a marker 24h2, which corresponds to the functional icon 30 "erase", are denoted by black solid rectangles.

According to the user interface function of the MFP 1000, when an item of a certain function is set, a user is informed about the presence of a function relating to the set item (called a "related function" below).

It is assumed that, in this embodiment, the following three functions fall under the related functions.

The first related functions are functions having items that are mutually in a restriction relationship. The restriction relationship herein is a relationship in which setting the items together is prohibited.

In the case where there are item details that are prohibited from being specified together with the set item details, a function to which the set item details belong and a function to which item details that are prohibited from being specified together with the set item details are related functions.

For example, it is impossible to set "separate" of the "book original" function and "Yes" of a "mirror image" function at the same time. In short, both the functions are in the restriction relationship. In such a case, the "book original" function and the "mirror image" function are related functions.

The second related functions are functions having items that are in an automatic set relationship.

In some instances, when item details of a certain function a1 are set, item details of another function a2 are set in association with the settings for the function a1. In such a case, the function a2 is a related function of the function a1, and vice versa.

In the case, for example, where "separate" of the "book original" function is set, "centering" of the "image shift" function and "non-image area erase" of the "erase" function are automatically set. In short, the "image shift" function and the "erase" function are related functions of the "book original" function.

The third related functions are functions having items that are highly likely to be specified successively at around the same time.

In some instances, immediately after item details of a certain function β1 are set, item details of another function β2 are highly likely to be set. In such a case, the function β2 is a related function of the function β1, and vice versa.

Here, "N-in-1" setting is taken as an example. The "N-in-1" setting is to print images on a plurality of pages onto one physical piece of paper with the size of the images on the pages reduced. A user often uses the "N-in-1" setting to save paper. Such a user is highly likely to also specify "double-sided". In such a case, the "continuous reading" function to which "N-in-1" belongs and the "original settings" function to which "double-sided" belongs are related functions.

Note that the restriction relationship may include a relationship in which functions are not recommended to be used at the same time. Item details highly likely to be set successively at around the same time may be item details determined based on the operation history.

According to the MFP 1000, the functional icons 30 are displayed in the functional icon area 23 by moving the slider 25 in such a manner that the functional icons 30 appear to slide onto the screen in accordance with the movement of the slider 25. Such a way to display the functional icons 30 is called "displaying with a sliding motion" below.

When looking for a certain functional icon 30, a user moves the slider 25 to display functional icons 30 in order with a sliding motion; thereby to find out the desired functional icon 30.

In the MFP 1000, while a functional icon 30 for a related function is displayed in the functional icon area 23, a speed for displaying with a sliding motion (called "sliding speed" below) is reduced as compared to a sliding speed for a functional icon 30 that does not correspond to the related function, so that the functional icon 30 for a related function is displayed in a manner different from that of the other functional icons 30. This enables a user to easily recognize that the functional icon 30 for a related function is displayed. To be specific, the sliding speed for the functional icon 30 for a related function is reduced while the speed at which the user drags the slider 25 with his/her finger remains unchanged. This allows the user to easily recognize that the functional icon 30 for a related function is displayed in the functional icon area 23, which makes it easier for the user to find out a desired functional icon 30.

Descriptions are given below, with reference to FIGS. 7-11, of displaying with a sliding motion of a functional icon 30 for a related function.

Figure 7:
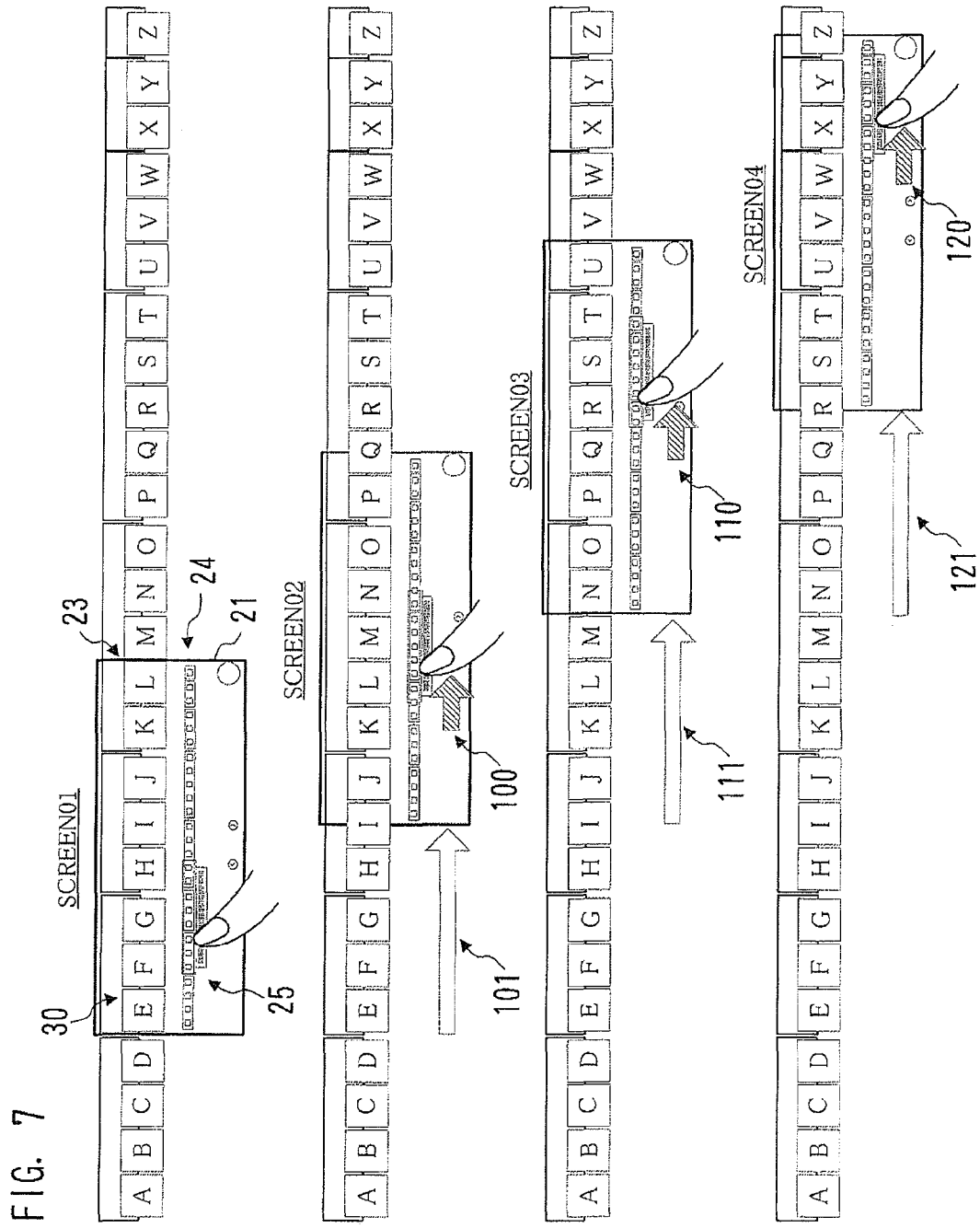
FIG. 7 is a diagram showing an example of a transition of displaying with a sliding motion on a screen for a case where there are no functional icons for a related function to be informed to a user.
Figure 8:
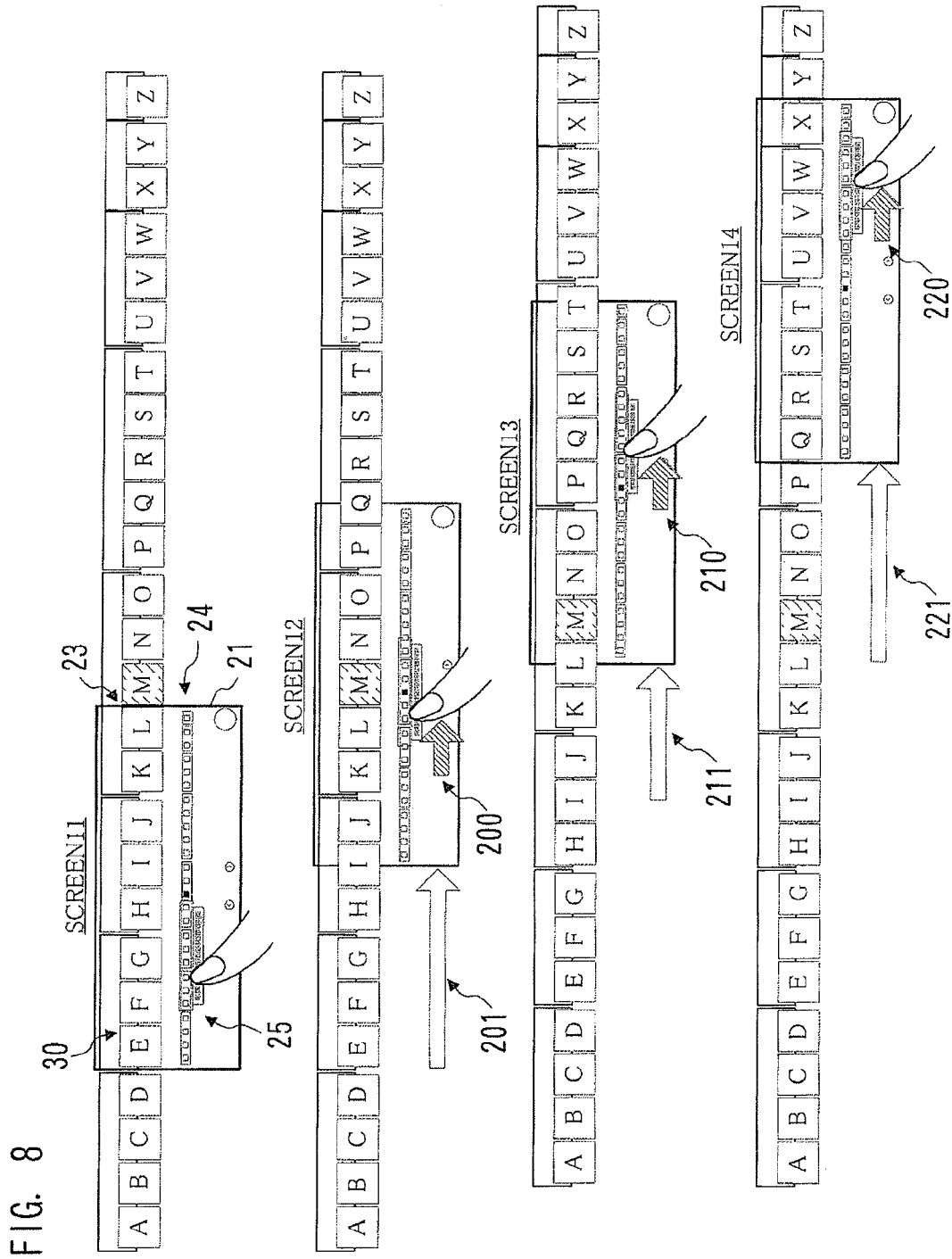
FIG. 8 is a diagram showing an example of a transition of displaying with a sliding motion on a screen for a case where there is a functional icon for a related function to be informed to a user.

FIGS. 7-9 show, in order from the top, screens displayed on the touchscreen portion 21 every set amount of time for a case where a user performs operation for dragging the slider 25 to the right at a constant speed.

The individual screens 01-04 and 11-14 show all the functional icons 30, and also show which of the functional icons 30 are displayed in the functional icon area 23. Stated differently, the screens 01-04 and 11-14 show the state in which as the user drags the slider 25, the functional icons 30 in the functional icon area 23 are displayed with a sliding motion. A hatched arrow in the drawings represents a finger travel distance per unit time when the user instructs the slider 25 to move across the screen. The length of a white solid arrow represents a distance through which the functional icons 30 in the functional icon area 23 appear to move. For example, the length of the white solid arrow 101 represents a distance through which the functional icons 30 appear to move for a case where the indication on the display is changed from the screen 01 to the screen 02.

FIG. 7 is a diagram showing a transition of displaying with a sliding motion on a screen for a case where there is no functional icon 30 for a related function to be informed to a user. The display made on the screen changes in the order of the screen 01, the screen 02, the screen 03, and the screen 04.

As shown in the hatched arrows 100, 110, and 120 of FIG. 7, if the finger travel distance is basically equal to one another, then a distance through which the functional icons 30 appear to move is equal to one another accordingly (see the white solid arrows 101, 111, and 121). In other words, if the finger moves at a constant speed, then the slider 25 moves at a constant speed, so that the functional icons 30 in the functional icon area 23 are displayed with a sliding motion at a constant speed.

FIG. 8 is a diagram showing a transition of displaying with a sliding motion on a screen for a case where there is a functional icon 30 for a related function to be informed to a user. The display made on the screen changes in the order of the screen 11, the screen 12, the screen 13, and the screen 14. User's finger travel speed is supposed to be the same as the case of FIG. 7.

Suppose that a functional icon 30M is a functional icon 30 for a related function (see the hatched functional icon 30).

In the illustrated example, it is assumed that the sliding speed is reduced at a time when the functional icon 30M for a related function is displayed at the center of the functional icon area 23 and the vicinity thereof, i.e., is close to the center of the screen, and the sliding speed returns to the original speed at a time when the functional icon area 23 passes through the functional icon 30M for a related function. Which position the sliding speed should be reduced at, and which position the sliding speed should return to the original speed at are not limited to this example. A user may arbitrarily make setting for such positions.

As shown in FIG. 8, the slider 25 moves in accordance with the movement of user's finger as with the case of FIG. 7 until the functional icon 30M is displayed around the center of the touchscreen portion 21, and the functional icons 30 in the functional icon area 23 are displayed with a sliding motion as with the case of FIG. 7 (compare between the screens 01-02 of FIG. 7 and the screens 11-12 of FIG. 8). Stated differently, the functional icons 30 appear to move by a predetermined distance (see a white solid arrow 201) in accordance with a finger travel distance (see a hatched arrow 200).

However, after being displayed around the center of the functional icon area 23, the functional icon 30M is displayed with a sliding motion with the sliding speed reduced (compare between the screens 02-03 of FIG. 7 and the screens 12-13 of FIG. 8). Stated differently, while the finger travels at a distance denoted by the arrow 210 that is the same as that denoted by the arrow 200, the functional icons 30 are displayed so as to move by a distance denoted by the arrow 211 only that is shorter than a predetermined distance denoted by the arrow 201.

After the functional icon area 23 passes through the functional icon 30M, the functional icons 30 are displayed with a sliding motion at the original (early-stage) sliding speed (compare between the screens 03-04 of FIG. 7 and the screens 13-14 of FIG. 8). Stated differently, the functional icons 30 appear to move by a predetermined distance (see a white solid arrow 221) in accordance with the finger travel speed (see a hatched arrow 220).

As discussed above, the MFP 1000 is configured to display the functional icons 30 in the functional icon area 23 with a sliding motion at a sliding speed depending on the movement speed of the slider 25. To be specific, reduction in the sliding speed of the functional icon area 23 means that the movement speed of the slider 25 is slow. In short, the user's finger travel speed is different from the movement speed of the slider 25.

FIG. 9 is a diagram showing the comparison between the screens 01-04 of FIG. 7 and the screens 11-14 of FIG. 8 in a chronological order.

When a comparison is made between the screen 03 and the screen 13, the screen 03 and the screen 13 are equal in finger position. However, when the functional icon 30M is not a functional icon for a related function (see the screen 03), the functional icon area 23 already passes through the functional icon 30M. In contrast, when the functional icon 30M is a functional icon for a related function (see the screen 13), the functional icon 30M is still displayed in the functional icon area 23.

In short, when the functional icon 30 is a functional icon for a related function, the sliding speed is slow, and consequently, the display time is long as compared to the case where the functional icon 30 is not a functional icon for a related function. Stated differently, with reference to the screens 11-14, the functional icon 30M for a related function is displayed with a slower sliding motion as compared to the other functional icons 30 that are not for a related function, e.g., the functional icon 30L, so that the functional icon 30M is displayed for a longer period of time as compared to the other functional icons 30 not for a related function.

Descriptions are given below, with reference to FIGS. 10 and 11, of the change in speed at which a functional icon 30 for a related function appears to slide on the screen.

Figure 10A:
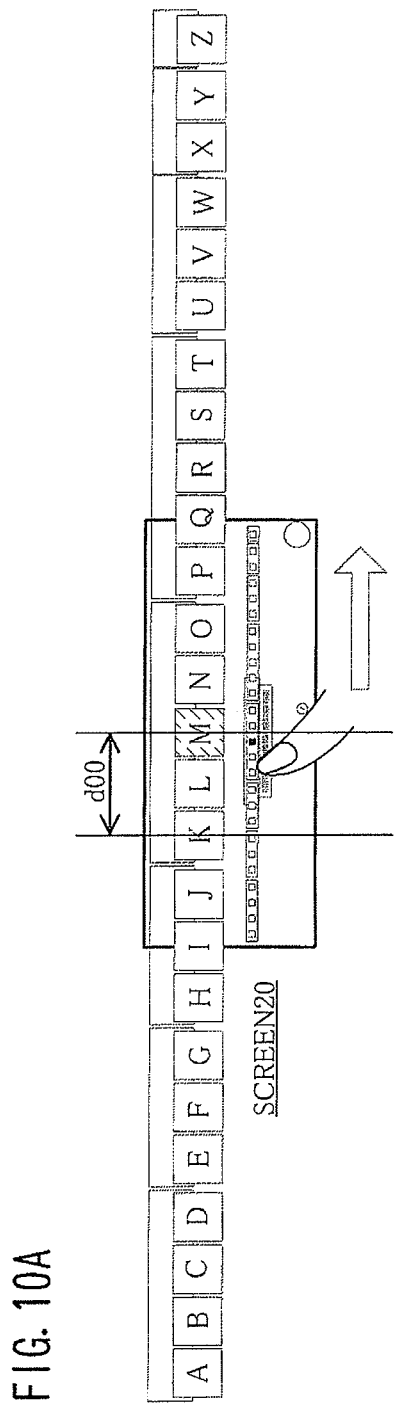
FIG. 10A is a diagram showing a section within which a speed to display a functional icon for a related function with a sliding motion is reduced.
Figure 10B:
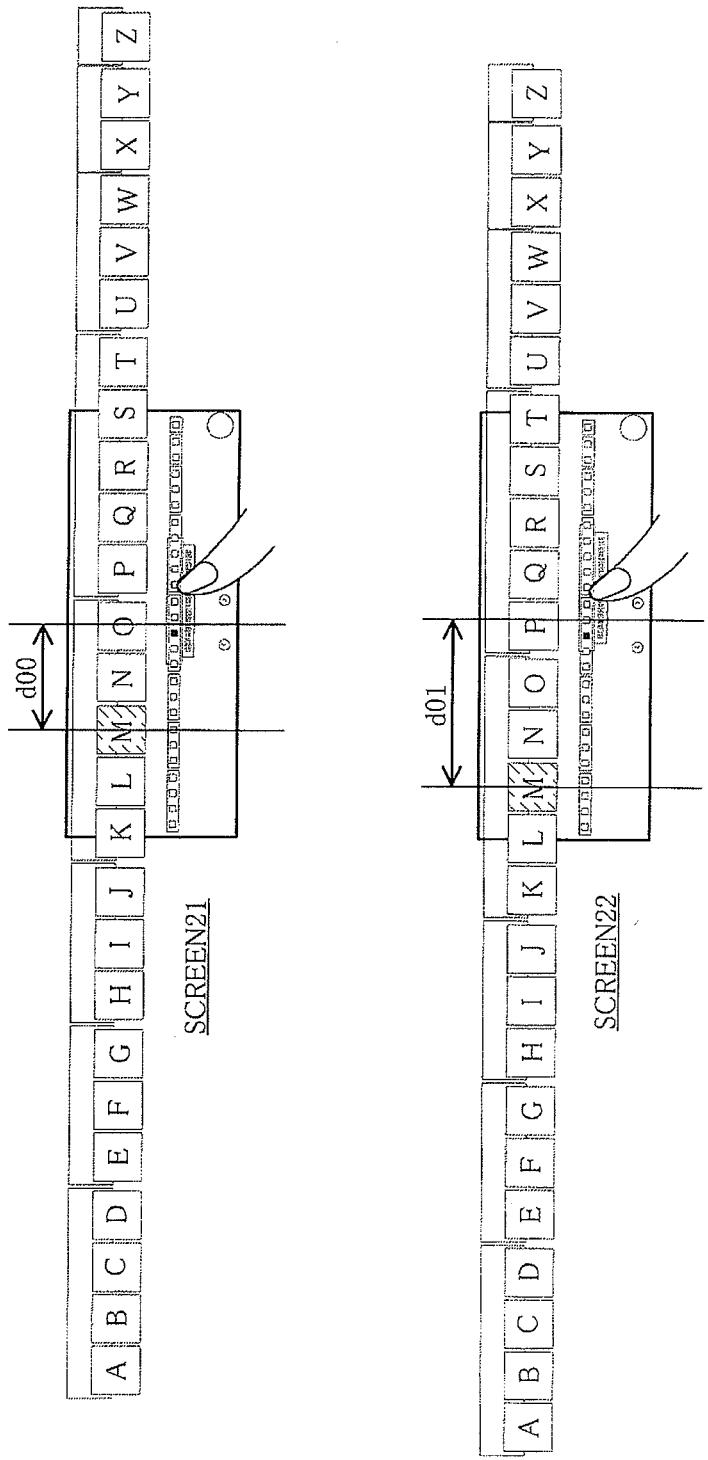
FIG. 10B is a diagram showing the comparison of movement distances.

FIG. 10A is a diagram showing a section within which a speed to display a functional icon for a related function with a sliding motion is reduced, and FIG. 10B is a diagram showing the comparison in distance through which the functional icon 30M is displayed so as to move between a case where the functional icon 30M is for a related function and a case where the functional icon 30M is not for a related function.

The screen 20 of FIG. 10A shows a section "d00" within which a display speed with a sliding motion is reduced. Here, the section "d00" is shorter than an area which ranges from the center of the functional icon area 23 to the outside thereof and within which a display speed with a sliding motion is reduced. This is to facilitate the comparison between the case where the functional icon 30 is for a related function and the case where the functional icon 30 is not for a related function.

Referring to FIG. 10A, the display speed with a sliding motion is reduced at a time when the functional icon 30 for a related function is displayed around the center of the touch-screen portion 21. The reduction in display speed is to draw the attention of the user to the functional icon 30 for a related function.

At a time when the functional icon 30 for a related function appears to move by a predetermined distance corresponding to the section "d00" from the center the functional icon area 23, the display speed with a sliding motion is supposed to return to the original (early-stage) speed.

The section "d00" has a length, for example, equal to the width of two functional icons 30. The section "d00" within which the functional icon 30 for a related function appears to move at a low speed is referred to as a "low-speed section".

FIGS. 10A and 10B show a display example in which a user drags the slider 25 to the right (see a white solid arrow), and thereby the functional icons 30 appear to slide on the screen to the left. Accordingly, if the user drags the slider 25 to the left, then the right part of the functional icon area 23 with respect to the center thereof corresponds to a low-speed section.

Another configuration is possible in which a low-speed section is fixed irrespective of the drag direction of the slider 25. For example, a section having a predetermined length around the center of the functional icon area 23 is deemed as a low-speed section.

FIG. 10B shows the comparison in distance through which the functional icon 30M appear to move when the slider 25 is moved by a predetermined distance between a case where the functional icon 30M is a functional icon 30 for a related function and a case where the functional icon 30M is not a functional icon 30 for a related function.

The section "d00" on the screen 21 represents a distance that the functional icon 30M is displayed so as to move for the case where the functional icon 30M is a functional icon 30 for a related function. At this time, the functional icon 30M is displayed so as to move by the length of "d00" which is the same as the distance of the low-speed section.

On the other hand, the screen 22 shows a distance that the functional icon 30M is displayed so as to move for the case where the functional icon 30M is not a functional icon 30 for a related function. At this time, the functional icon 30M is displayed so as to move by the length of "d01".

To be specific, when a user moves his/her finger to move (drags) the slider 25 by a predetermined distance, the functional icon 30M which is not a functional icon 30 for a related function is displayed so as to move by the length of the section "d01", and the functional icon 30M which is a functional icon 30 for a related function is displayed so as to move by the length of the low-speed section "d00". In the illustrated example, the functional icon 30M which is a functional icon 30 for a related function is displayed with a sliding motion at a speed of, for example, two thirds of the speed at which the functional icon 30M which is not a functional icon for a related function is displayed to move.

Figure 11:
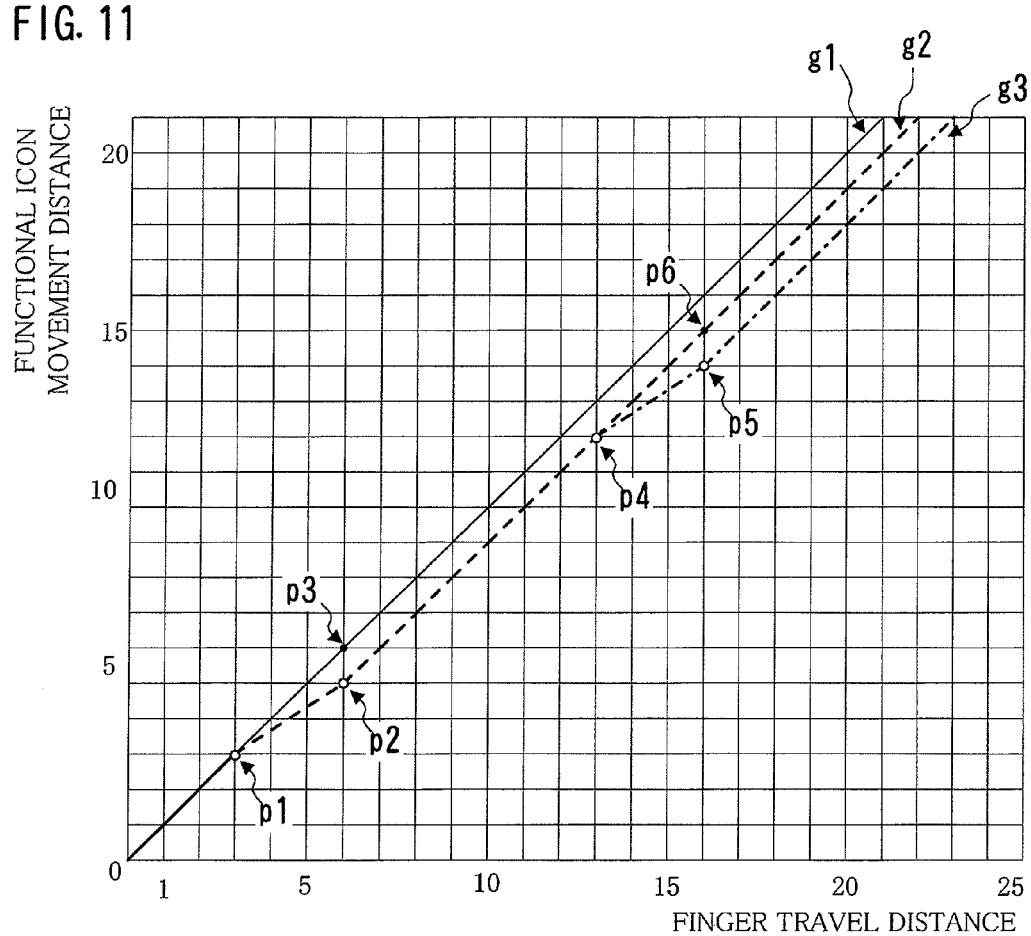
FIG. 11 is a graph showing a change in display speed of a functional icon.

FIG. 11 is a graph showing a change in display speed of functional icons 30.

The horizontal axis represents a finger travel distance through which a user drags the slider 25 with his/her finger, and the vertical axis represents a distance through which the functional icons 30 appear to move. One scale mark on the horizontal axis indicates an interval between markers, and one scale mark on the vertical axis indicates an interval between the functional icons 30. The same is similarly applied to FIGS. 14 and 15.

A solid line g1 indicates a state in which a display speed of the functional icons 30 is in the early stage, i.e., is not slow. Stated differently, the solid line g1 indicates a case where the slider 25 moves in accordance with the finger travel speed.

A point p1 corresponds to a state of the screen 20 of FIG. 10A, and a point p2 corresponds to a state of the screen 21 of FIG. 10B. To be more specific, the point p1 shows a time at which the functional icon 30M for a related function reaches the center of the functional icon area 23. The point p2 shows a time at which the functional icon 30M for a related function almost passes through the low-speed section "d00". A point p3 corresponds to a state of the screen 22 of FIG. 10B. To be more specific, the point p3 shows a time at which a user moves his/her finger by the same distance as the case of the screen 21 for a case where the functional icon 30M is not for a related function.

To be more specific, at a part between the point p1 and the point p2, the sliding speed is reduced to two thirds of the sliding speed in the early stage (compare with the point p3). After the point 2, the sliding speed returns to the speed in the early stage as indicated by a dotted line g2.

Likewise, at a part between the point p4 and the point p5, the sliding speed is reduced to two thirds of the sliding speed in the early stage (compare with the point p6). After the point 5, the sliding speed returns to the speed in the early stage as indicated by a dot-dash line g3.

In this way, the sliding speed is reduced when the functional icon 30M for a related function reaches the center of the touchscreen portion 21. This helps the user to visually recognize that the functional icon 30M for a related function is displayed.

In FIG. 11, the sliding speed at which the functional icons 30 are displayed so as to move is denoted by the solid ling g1 up to the point p1, by the dotted line g2 for a part between the point p1 and the point 4, and by the dot-dash line g3 for a part beyond the point 4.

The following is a description of the user interface function equipped in the MFP 1000 with reference to FIG. 5.

FIG. 5 is a block diagram showing an example of the functional configuration of the MFP 1000.

FIG. 5 focuses on functional portions relating to the user interface function of the MFP 1000. The MFP 1000 is also provided with functions similar to those of an ordinary multifunction device; however, the description of these functions is omitted herein.

The MFP 1000 is configured of the operational panel 20f, an entirety control portion 1100, a scroll screen control portion 1200, an automatic settings processing portion 1250, a related icon determining portion 1300, a user command display speed calculation portion 1400, a related icon display speed calculation portion 1450, a scanner processing portion 1500, a print processing portion 1600, a related icon management table storage portion 1700, a related icon storage portion 1750, an item setting details storage portion 1800, an item initial value storage portion 1900, and the like.

The CPU 20a executes programs stored in a memory such as the hard disk 20d of the MFP 1000; thereby the whole or a part of functions of the individual portions of the MFP 1000 are implemented as described below.

The entirety control portion 1100 performs overall control of the operation of the MFP 1000. The entirety control portion 1100 is operable to detect operation performed by a user on the operational panel 20f, and to perform control of the operation. In the case, for example, where the RESET key 22a (see FIG. 3) is pressed, the entirety control portion 1100 gives a reset command to a functional portion for which the reset operation is necessary, and so on. In the case, for example, where the SCROLL key 22b (see FIG. 3) is pressed, the entirety control portion 1100 performs control in such a manner that the scroll screen control portion 1200 displays a scroll screen, and so on.

Under the control of the entirety control portion 1100, the scroll screen control portion 1200 displays a scroll screen on the touchscreen portion 21 of the operational panel 20f. In the case, for example, where, after turning the MFP 1000 ON, a user presses the SCROLL key 22b without changing any settings, the scroll screen control portion 1200 refers to initial values stored in the item initial value storage portion 1900, and displays a scroll screen based on the referred initial values.

The scroll screen control portion 1200 has a function to display, after displaying the scroll screen, a screen depending on a command given by a user. For example, the scroll screen control portion 1200 moves the slider 25 along the scroll track 24 in accordance with drag operation by the user to display functional icons 30 in the functional icon area 23 depending on the movement of the slider 25.

For a case where no functional icon 30 for a related function is present within a low-speed section, the scroll screen control portion 1200 shows the display with the slider 25 moved at a speed informed by the user command display speed calculation portion 1400, and displays the functional icons 30 with a sliding motion in accordance with the movement of the slider 25.

In contrast, for a case where a functional icon 30 for a related function is present within a low-speed section, the scroll screen control portion 1200 shows the display with the slider 25 moved at a speed informed by the related icon display speed calculation portion 1450, and displays the functional icons 30 with a sliding motion in accordance with the movement of the slider 25. Note that whether or not the functional icons 30 displayed are functional icons 30 for a related function is determined by referring to information that is stored in the related icon storage portion 1750 and indicates functional icons 30 for a related function.

If receiving the reset command from the entirety control portion 1100, the scroll screen control portion 1200 returns the item details 303 (see FIG. 3) of all the functional icons 30 to the initial values stored in the item initial value storage portion 1900. In such a case, the scroll screen control portion 1200 deletes information that is stored in the related icon storage portion 1750 and indicates functional icons 30 for a related function.

The scroll screen control portion 1200 also has a function to, when a user touches a functional icon 30, obtain item details concerning a function specified by the functional icon 30. For example, the scroll screen control portion 1200 displays the item setting screen 1210 (see FIG. 6) to obtain details specified by the user. The scroll screen control portion 1200 conveys the obtained details to the automatic settings processing portion 1250, and causes the same to store the item details into the item setting details storage portion 1800. If the functional icon 30 touched by the user is a functional icon 30 that is configured to, if being touched, switch between "ON" and "OFF", then the scroll screen control portion 1200 conveys item details specified by the user to the automatic settings processing portion 1250, and causes the same to store the item details into the item setting details storage portion 1800. If the setting details before the touch operation is "ON", then the specified item details are "OFF". If the setting details before the touch operation is "OFF", then the specified item details are "ON". The scroll screen control portion 1200 changes the display of the functional icons 30, if necessary, in accordance with the specified details.

The automatic settings processing portion 1250 has a function to receive, in response to the item details specified by the user, the item details from the scroll screen control portion 1200, and stores the received item details into the item setting details storage portion 1800. The automatic settings processing portion 1250 also determines whether or not there is an item to be automatically changed depending on the item details specified by the user. If the automatic settings processing portion 1250 determines that there is an item to be automatically changed, then the automatic settings processing portion 1250 changes the details of the item to appropriate details, and stores the post-change details into the item setting details storage portion 1800. This is so-called automatic setting.

The related icon determining portion 1300 is operable to determine whether or not there is a functional icon 30 related to a certain functional icon 30 based on the command given by the scroll screen control portion 1200, and to send the determination result to the scroll screen control portion 1200. If the related icon determining portion 1300 determines that there is such a functional icon 30, then the related icon determining portion 1300 also sends information (an identifier of) on that functional icon 30 to the scroll screen control portion 1200. The scroll screen control portion 1200 stores, into the related icon storage portion 1750, the identifier of that related functional icon 30 received from the related icon determining portion 1300.

The user command display speed calculation portion 1400 is operable to calculate, when the user performs operation for dragging the slider 25, a user's finger travel speed for the operation, and to inform the scroll screen control portion 1200 of the calculation result.

The user command display speed calculation portion 1400 informs the scroll screen control portion 1200 of user's finger travel speed at a time when the scroll speed is changed from one to another. Accordingly, before receiving a new notice about the scroll speed, the scroll screen control portion 1200 provides a scrolled display at the current scroll speed.

The user command display speed calculation portion 1400 periodically receives, from the operational panel 20f, information on coordinate values of the screen touched by a user, and determines whether or not to move the slider 25 based on the coordinate values. If the user command display speed calculation portion 1400 determines that the coordinate values imply a command to move the slider 25, then the user command display speed calculation portion 1400 calculates user's finger travel speed based on the coordinate values to inform the scroll screen control portion 1200 of the calculation result. The user command display speed calculation portion 1400 also informs the related icon display speed calculation portion 1450 of the user's finger travel speed.

The related icon display speed calculation portion 1450 has a function to calculate a display speed of the slider 25 for a period of time during which a functional icon 30 for a related function is within a low-speed section, and to inform the scroll screen control portion 1200 of the calculated display speed. The related icon display speed calculation portion 1450 calculates a display speed of the slider 25 for a period of time during which a functional icon 30 for a related function is within a low-speed section based on the user's finger travel speed calculated by the user command display speed calculation portion 1400. To be specific, the related icon display speed calculation portion 1450 deems a speed corresponding to two thirds of the speed informed by the user command display speed calculation portion 1400 as a display speed of the functional icon 30 for a related function. Every time the user command display speed calculation portion 1400 informs the related icon display speed calculation portion 1450 of user's finger travel speed, the related icon display speed calculation portion 1450 calculates a display speed of the slider 25 for the case where the functional icon 30 for a related function is within a low-speed section, and sends the calculation result to the scroll screen control portion 1200.

In response to a command from the entirety control portion 1100, the scanner processing portion 1500 scans a drawing or the like on a paper document, generates image data thereof, and store the image data into a memory.

In response to a command from the entirety control portion 1100, the print processing portion 1600 prints an image onto paper based on the image data stored in the memory to output the paper.

The related icon management table storage portion 1700 has a function to store information indicating which functional icon 30 is related to which functional icon 30.

The related icon storage portion 1750 serves to store, thereinto, identifiers of functional icons 30 determined to be functional icons for a related function by the related icon determining portion 1300. The storing process id performed under the control by the scroll screen control portion 1200. The identifiers to be stored herein are identifiers of the functional icons 30 that the related icon determining portion 1300 has sent as the functional icons 30 for a related function. If receiving the determination result that there are no functional icons 30 for a related function from the related icon determining portion 1300, then the scroll screen control portion 1200 deletes, from the related icon storage portion 1750, an identifier of a functional icon 30 that has not been related any more to the function.

The item setting details storage portion 1800 is operable to store item details set by a user by touching a functional icon 30. The item setting details storage portion 1800 also stores item details automatically set by the automatic settings processing portion 1250. The item details are referred to by the print processing portion 1600, for example, when the print processing portion 1600 performs a print process.

The item initial value storage portion 1900 is operable to store the initial values of item details of the functional icons 30. The initial values herein mean setting details of the functional icons 30 at a time when the MFP 1000 starts up.

[Data]

Descriptions are provided below, with reference to FIG. 12, of data used when the MFP 1000 implements the user interface function.

FIG. 12 is a diagram showing an example of the structure and details of a related icon management table 1710.

The related icon management table storage portion 1700 stores, thereinto, the related icon management table 1710 in advance. The content of the related icon management table 1710 may be set appropriately by, for example, an administrator of the MFP 1000. Items that are highly likely to be set concurrently may be set based on a history of usage of a user, or, may be set automatically.

The related icon management table 1710 includes a set number 1711, and items 1712-1714. Each of the items 1712-1714 contains "setting details" indicating details of a set item, and an "icon identifier" indicating a functional icon 30 for setting the corresponding item. Hereinafter, an item settable by touching a certain functional icon 30 may be called an item belonging to a certain functional icon 30.

In the related icon management table 1710, items relating to each other and functional icons 30 (icon identifiers) to which the items belong are registered as one set, i.e., as one record having the structure described above.

The set number 1711 is the number of a record registered in the related icon management table 1710. The set number 1711 indicates the number for distinguishing a set of functional icons 30 related to one another from the other sets of functional icons 30.

The setting details of the items 1712-1714 indicate the details of items to be set.

The icon identifier of each of the items 1712-1714 indicates an identifier for specifying a functional icon 30 corresponding to the icon identifier. In the illustrated example, for the sake of convenience, a function name of a functional icon 30 is described as an icon identifier.

The absence of a related item and a related functional icon 30 is respectively denoted by "–" in the fields of items 1712-1714 of records.

For example, a record specified as "4" in the set number 1711 is a record in which setting items are mutually in a restriction relationship. Referring to the record, "separate" set in the setting details of the item 1712 and "Yes" set in the setting details of the item 1713 are items mutually in a restriction relationship. "Separate" is an item of a functional icon 30 for "book original" set in the icon identifier of the item 1712. "Yes" is an item of a functional icon 30 for "mirror image" set in the icon identifier of the item 1713.

For example, a record specified as "1" in the set number 1711 is a record in which items automatically set are specified. Referring to the record, when a user specifies "separate" set in the setting details of the item 1712, "centering" and "non-image area erase" set in the setting details of the item 1713 and the item 1714 respectively are automatically set. "Separate" is an item of a functional icon 30 for "book original" set in the icon identifier of the item 1712. "Centering" is an item of a functional icon 30 for "image shift" set in the icon identifier of the item 1713. "Non-image area erase" is an item of a functional icon 30 for "erase" set in the icon identifier of the item 1714.

For example, a record specified as "2" in the set number 1711 is a record in which items highly likely to be set at the same time are specified. Referring to the record, "double-sided" set in the setting details of the item 1712 and "N-in-1" set in the setting details of the item 1712 are items highly likely to be set at the same time. "Double-sided" is an item of a functional icon 30 for "original setting" set in the icon identifier of the item 1712. "N-in-1" is an item of a functional icon 30 for "continuous reading" set in the icon identifier of the item 1713.

While FIG. 12 shows an example in which the number of items related to each other is up to 3, but the number of such items are not limited thereto.

[Operation]

Figure 13:
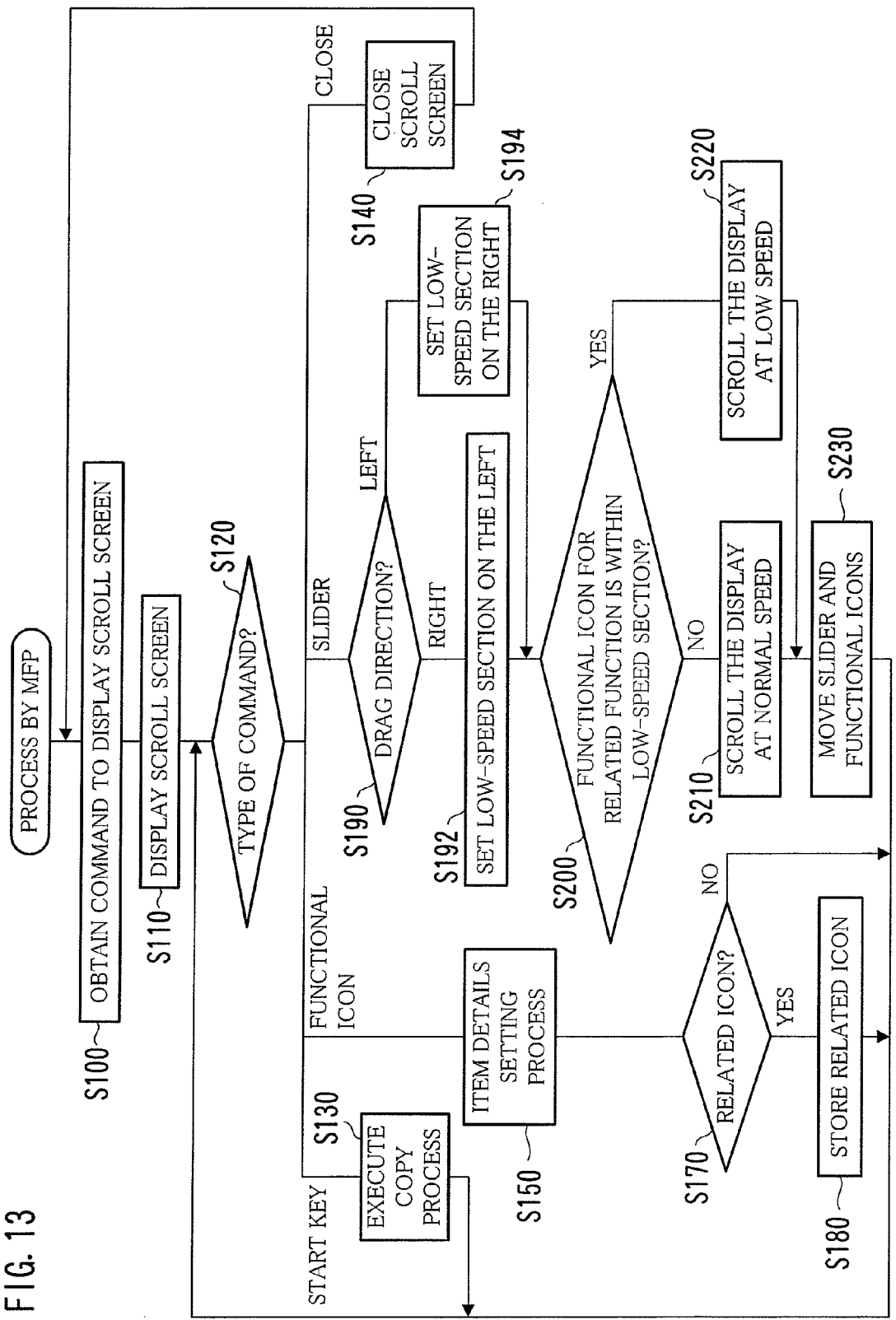
FIG. 13 is a flowchart depicting an example of a process for changing a speed at which a functional icon for a related function is scroll-displayed.

The following is a description of operation of the MFP 1000 according to this embodiment for a case where the MFP 1000 implements the user interface function, with reference to FIG. 13.

FIG. 13 is a flowchart depicting an example of a process for for changing a speed at which a functional icon for a related function is scroll-displayed in a scroll screen displayed on the operational panel 20f.

When detecting that a user presses the "SCROLL" key 22b and a command to display the scroll screen is given, the entirety control portion 1100 instructs the scroll screen control portion 1200 to display a scroll screen for copy (Step S100).

In response to the instructions, the scroll screen control portion 1200 reads out initial values stored in the item initial value storage portion 1900 and displays, on the operational panel 20f, the scroll screen for copy in which the initial values are specified as the setting items (Step S110) (see the touch-screen portion 21 of FIG. 3). If the item setting details storage portion 1800 stores item details therein, then the scroll screen control portion 1200 reads out the item details stored therein and specifies the item details.

The scroll screen control portion 1200 is on standby until input, by a user, of any one of the following (1) to (4) is detected. When detecting the input of any one of the following (1) to (4), the scroll screen control portion 1200 performs processes described below depending on the detection.

(1) Case where a functional icon 30 is touched

When detecting that a functional icon 30 displayed in the functional icon area 23 is touched (Step S120: functional icon), the scroll screen control portion 1200 displays the item setting screen 1210 (see FIG. 6) for the touched functional icon 30.

The user selects item details on the item setting screen 1210, and touches an "OK" button 40.

When detecting that the "OK" button 40 is touched and the item details setting are made, the scroll screen control portion 1200 stores the item details into the item setting details storage portion 1800 through the automatic settings processing portion 1250. The scroll screen control portion 1200, then, closes the item setting screen 1210.

Alternatively, as for a functional icon 30 that is configured to switch between "ON" and "OFF" by being touched, if a user touches such a functional icon 30, then the scroll screen control portion 1200 stores the set item details into the item setting details storage portion 1800 through the automatic settings processing portion 1250 (Step S150). To be specific, if the setting details before the touching operation is "ON", then the set item details are "OFF". If the setting details before the touch operation is "OFF", then the set item details are "ON".

After storing the set item details into the item setting details storage portion 1800, the scroll screen control portion 1200 conveys, to the related icon determining portion 1300, the set item details and an identifier of the functional icon 30 for which the item has been set (such an identifier is hereinafter referred to as a "set functional icon identifier"). The scroll screen control portion 1200, then, inquires the related icon determining portion 1300 as to whether or not there is a functional icon 30 relating to the set item details.

In response to the inquiry, the related icon determining portion 1300 makes a determination as to whether or not there is a functional icon 30 having an item relating to the item details received from the scroll screen control portion 1200 (Step S170). The determination is made by referring to the related icon management table 1710 stored in the related icon management table storage portion 1700.

To be specific, the related icon determining portion 1300 searches in order, from the record corresponding to "1" of the set number 1711, for a record in which the setting details of the setting items 1712-1714 indicate the received item details.

If such a record is found out by the search, then the related icon determining portion 1300 determines that there is a functional icon 30 for a related function. Otherwise, the related icon determining portion 1300 determines that there are no functional icon 30 for a related function.

If determining that there is a functional icon 30 for a related function (Step S170: Yes), then the related icon determining portion 1300 informs the scroll screen control portion 1200 of the fact. The related icon determining portion 1300 also conveys the record found out by the search to the scroll screen control portion 1200.

In response to receiving the fact, the scroll screen control portion 1200 stores, into the related icon storage portion 1750, the record sent from the related icon determining portion 1300 (Step S180). The scroll screen control portion 1200 also changes a display status of a marker, e.g., the color thereof, corresponding to a functional icon 30 identified by an identifier set in the icon identifier of the record. Such an identifier is hereinafter called a "related functional icon identifier". Subsequently, the process goes back to Step S120 and the scroll screen control portion 1200 waits for the user to give the next command.

On the other hand, in Step S170, if determining that there is no functional icon 30 for a related function (Step S170: No), then the related icon determining portion 1300 informs the scroll screen control portion 1200 of the fact.

When the scroll screen control portion 1200 receives the fact, the process goes back to Step S120, and the scroll screen control portion 1200 waits for the user to give the next command.

(2) Case where the slider 25 is dragged

When detecting, in Step S120, that the slider 25 is dragged (Step S120: slider), the scroll screen control portion 1200 judges the drag direction (Step S190). In short, the scroll screen control portion 1200 determines which direction user's finger has moved to.

If determining that the slider 25 is dragged to the right (Step S190: right), then the scroll screen control portion 1200 regards the left part of the functional icon area 23 with respect to the center thereof as a low-speed section (Step S192) (see "d00" of FIG. 10A).

On the other hand, if determining that the slider 25 is dragged to the left (Step S190: left), then the scroll screen control portion 1200 regards the right part of the functional icon area 23 with respect to the center thereof as a low-speed section (Step S194).

Subsequently, the scroll screen control portion 1200 determines whether or not a functional icon 30 identified by a related functional icon identifier stored in the related icon storage portion 1750 is within the low-speed section (see the low-speed section d00 of FIG. 10A).

Unless the functional icon 30 identified by the related functional icon identifier is within the low-speed section (Step S200: No), then the scroll screen control portion 1200 scrolls the display at a travel speed calculated and notified by the user command display speed calculation portion 1400, namely, at a normal travel speed (Step S210, and Step S230).

The user command display speed calculation portion 1400 calculates a travel speed depending on the drag operation by the user. If the travel speed is changed, the user command display speed calculation portion 1400 informs the scroll screen control portion 1200 and the related icon display speed calculation portion 1450 of the post-change travel speed appropriately.

If any one of the functional icons 30 identified by related functional icon identifiers stored in the related icon storage portion 1750 is within the low-speed section (Step S200: Yes), then the scroll screen control portion 1200 moves the slider 25 at a movement speed informed by the related icon display speed calculation portion 1450, and displays the functional icons 30 with a sliding motion accordingly (Step S220, and Step S230).

When receiving the notice on travel speed from the user command display speed calculation portion 1400, the related icon display speed calculation portion 1450 calculates a travel speed within the low-speed section, and informs the scroll screen control portion 1200 of the calculation result.

The process, then, goes back to Step S120, and the scroll screen control portion 1200 waits for the user to give the next command. To be specific, if any one of the functional icons 30 identified by the related functional icon identifiers is within the low-speed section (Step S200: Yes), then the scroll screen control portion 1200 continues the scroll operation at the movement speed informed by the related icon display speed calculation portion 1450 (Step S220, and Step S230).

On the other hand, if all the functional icons 30 identified by the related functional icon identifiers are outside the low-speed section (Step S200: No), then the scroll screen control portion 1200 is supposed to perform the scroll operation at a normal movement speed (Step S210, and Step S230).

(3) Case where the CLOSE button 26 is touched

When detecting, in Step S120, that the CLOSE button 26 is touched based on the obtained coordinate values on the touch-screen portion 21 (Step S120: close), the entirety control portion 1100 requests the scroll screen control portion 1200 to close the scroll screen.

In response to the request, the scroll screen control portion 1200 closes the scroll screen for copy displayed on the touch-screen portion 21 (Step S140). Then, the process goes back to Step S100.

(4) Case where a START key is touched

When detecting, in Step S120, that the START key is pressed on the operational key portion 22 (Step S120: START key), the entirety control portion 1100 controls the scanner processing portion 1500 and the print processing portion 1600 to perform a copy process (Step S130). After the copy process is carried out, the process goes back to Step S120, and the entirety control portion 1100 waits for the user to give the next command.

SPECIFIC EXAMPLE

The following description is given by taking a specific example in which a user touches a functional icon 30 named "book original" to display the item setting screen 1210, and the user specifies "separate" thereon.

The user touches the functional icon 30 named "book original" on the scroll screen (Step S150) to display the item setting screen 1210. The user selects "separate" on the item setting screen 1210 and touches the "OK" button 40 (Step S150).

At this time, the scroll screen control portion 1200 stores "separate" into the item setting details storage portion 1800 through the automatic settings processing portion 1250. The scroll screen control portion 1200 conveys, to the related icon determining portion 1300, "separate" as the set item details and an identifier of the "book original" functional icon 30 as the set functional icon identifier. The scroll screen control portion 1200, then, inquires the related icon determining portion 1300 as to whether or not there is a functional icon 30 for a related function.

In response to the inquiry, the related icon determining portion 1300 searches in order, from the record having "1" in the set number 1711, for a record in which "separate" is specified in the setting details of the items 1712-1714. The records having "1" and "4" respectively in the set number 1711 are found out by the search, and the related icon determining portion 1300 determines that there is a functional icon 30 for a related function (Step S170: Yes). Then, the related icon determining portion 1300 informs the scroll screen control portion 1200 of the fact. The related icon determining portion 1300 also conveys the records found out by the search, i.e., the records having "1" and "4" respectively in the set number 1711, to the scroll screen control portion 1200.

The scroll screen control portion 1200 stores, into the related icon storage portion 1750, the records having "1" and "4" respectively in the set number 1711 sent from the related icon determining portion 1300 (Step S180).

After the user sets "separate" in the functional icon 30 for "book original", he/she performs operation for dragging the slider 25 to the right.

At this time, the scroll screen control portion 1200 detects that the slider 25 has been dragged (Step S120: slider), and determines that the slider 25 is dragged to the right (Step S190: right).

The scroll screen control portion 1200 regards the left part of the functional icon area 23 with respect to the center thereof as a low-speed section (Step S192, see "d00" of FIG. 10A), because the scroll screen control portion 1200 determines that the slider 25 is dragged to the right (Step S190: right).

Subsequently, the scroll screen control portion 1200 determines whether or not the functional icons 30 identified by the related functional icon identifiers stored in the related icon storage portion 1750 are within the low-speed section (Step S200).

The records having "1" and "4" respectively in the set number 1711 of the related icon management table 1710 are stored in the related icon storage portion 1750. Accordingly, related functional icon identifiers, which are identifiers set in the icon identifiers of those records, are "book original", "image shift", "erase", and "mirror image".

If none of the functional icons 30 showing those related functional icon identifiers are within the low-speed section (Step S200: No), then the scroll screen control portion 1200 performs scroll operation at a normal speed (Step S210, and Step S230).

When the user drags the slider 25, and any one of the functional icons 30 showing the related functional icon identifiers are displayed in the low-speed section, i.e., reach the low-speed section, the scroll screen control portion 1200 performs the scroll operation on the display at a movement speed informed by the related icon display speed calculation portion 1450, i.e., at a slow speed (Step S220, and Step S230).

Stated differently, if any one of the functional icons 30 showing the related functional icon identifiers "book original", "image shift", "erase", and "mirror image" is close to the low-speed section, then the scroll screen control portion 1200 performs the scroll operation at a low speed. Further, while any one of those functional icons 30 is within the low-speed section, the scroll screen control portion 1200 performs the scroll operation at a low speed.

As discussed above, a functional icon 30 for a related function is scroll-displayed at a speed lower than a normal speed. This enables a user to easily find out functions to which an item relating to the item details set by him/her belongs.

Although the embodiments of the present invention have been described above, the present invention is not limited thereto. The following arrangement is possible.

In the embodiments described above, while a functional icon 30 for a related function is within a low-speed section, the movement speed of the slider 25 is reduced, so that functional icons 30 are displayed with a sliding motion at a lower speed. Stated differently, the slider 25 is displayed at a position different from the user finger position.

Instead, however, the slider 25 may be dragged in synchronization with the movement of user's finger, thereby to reduce the speed at which the functional icons 30 are displayed with a sliding motion. Stated differently, a functional icon 30 corresponding to a marker specified by the slider 25 is not displayed in the functional icon area 23. In such a case, it is necessary to display functional icons 30 specified by the slider 25 in the functional icon area 23 at a certain time, e.g., at a time in which the sliding speed returns to the original speed; thereby to synchronize the slider 25 with the displayed functional icons.

2) In the embodiments discussed above, reducing a speed at which a related functional icon appears to slide onto the screen helps a user to recognize the related functional icon. However, another method may be applied to help the user to recognize the related functional icon.

For example, it is possible to stop displaying with a sliding motion during a predetermined period of time.

Figure 14:
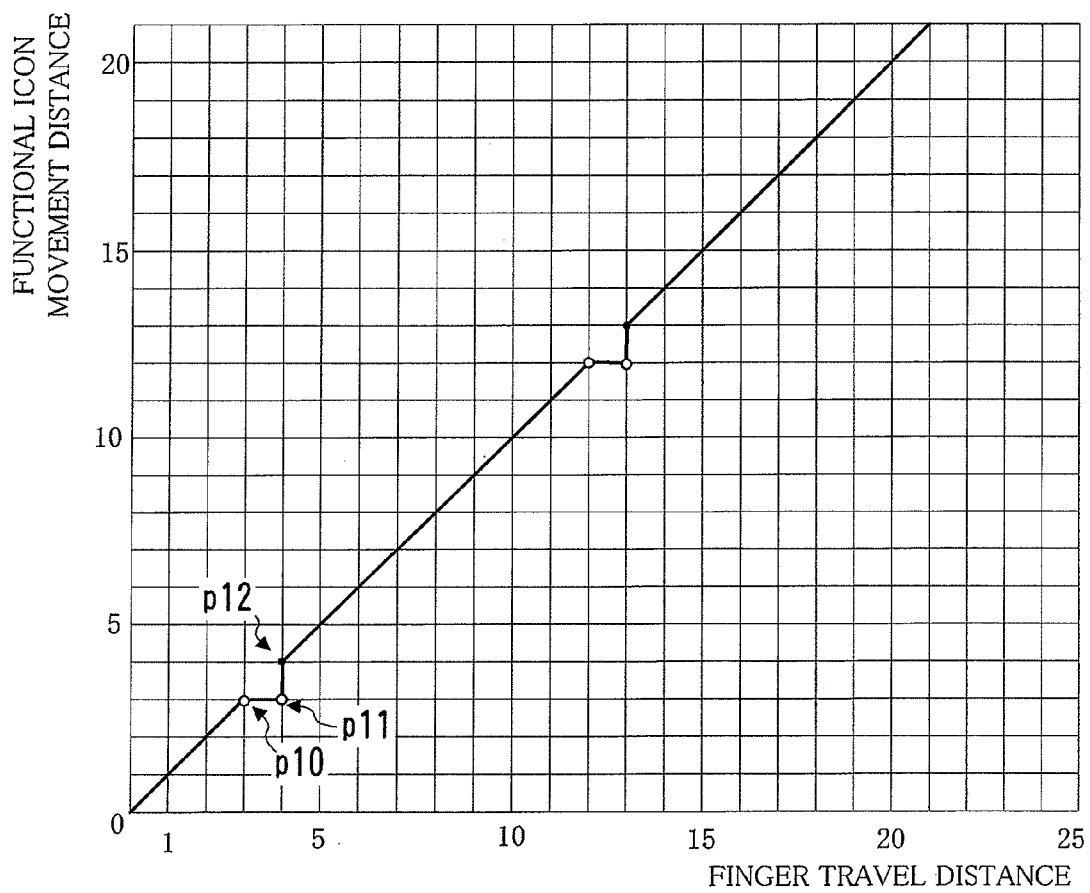
FIG. 14 is a modified graph showing a change in display speed of a functional icon.

As shown in FIG. 14, displaying with a sliding motion is stopped in a part between a point p10 and a point p11, and, at a point p12, functional icons are displayed which are supposed to be displayed with a sliding motion if displaying is not stopped. The point p10 represents a time at which a functional icon for a related function reaches a predetermined position on the screen. The point p11 represents a time at which a predetermined amount of time has passed since the functional icon for a related function reached the predetermined position. Note that the point p11 may denote the passage of a period of time during which a functional icon for a related function appears to move by a predetermined distance instead of the predetermined amount of time.

Figure 15:
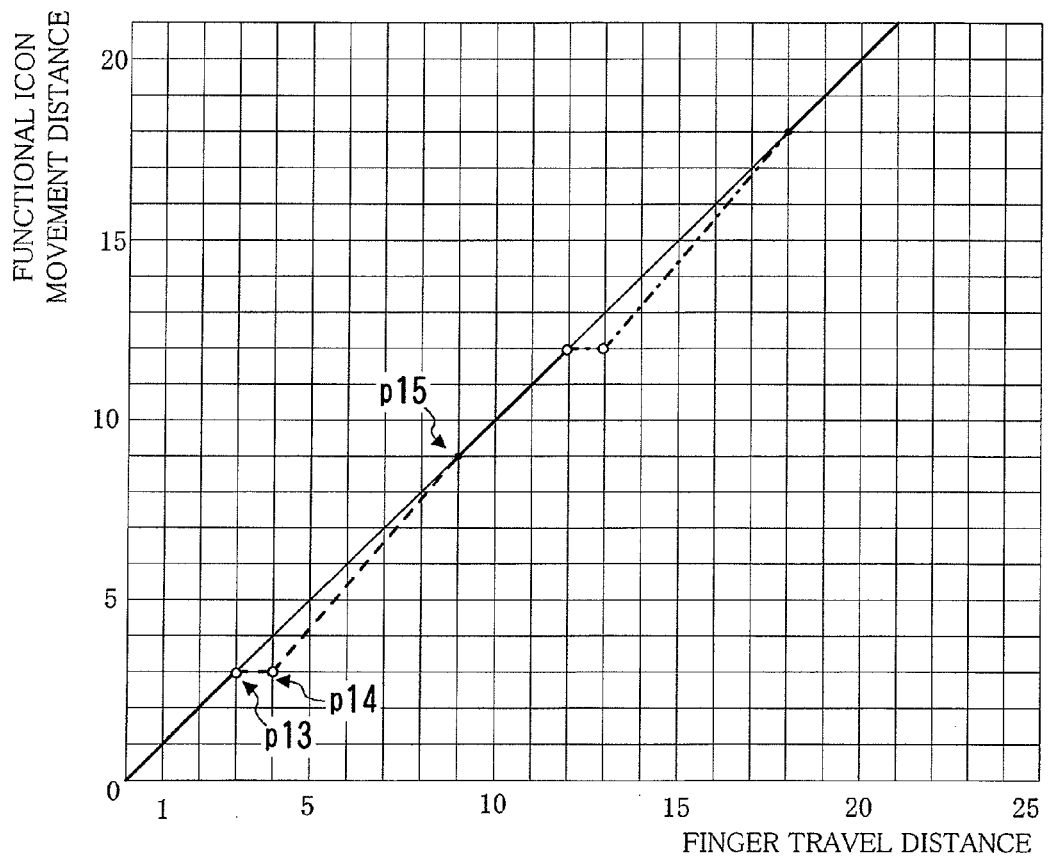
FIG. 15 is another modified graph showing a change in display speed of a functional icon.

Another configuration is possible in which, as shown in FIG. 15, displaying with a sliding motion is stopped in a part between a point p13 and a point p14, and sliding speed is increased at a point p15 in a manner to display functional icons 30 that are supposed to be displayed with a sliding motion if displaying is not stopped. The point p13 represents a time at which a functional icon for a related function reaches a predetermined position on the screen. The point p14 represents a time at which a predetermined amount of time has passed since the functional icon for a related function reached the predetermined position.

3) In the embodiments discussed above, a relating functional icon 30 is a functional icon 30 for which items mutually in a restriction relationship are settable, a functional icon 30 for which items highly likely to be set at the same time, or the like. However, the relating functional icon 30 is not limited thereto, and may be a functional icon 30 having other relationships.

For example, a related functional icon 30 may be selected only based on set items irrespective of the setting details specified in the items. In such a case, the related icon management table storage portion 1700 is caused to store, thereinto, a related icon management table in which identifiers of the functional icons 30 are associated with each other.

4) Reduction in sliding display speed of a functional icon for a related function may be limited to a case where no settings are made to a function corresponding to the functional icon.

5) In the embodiments described above, when a functional icon 30 for a related function is within a low-speed section of the functional icon area 23, the display is scrolled at a low speed. Instead, however, when a functional icon 30 whose setting details are changed by a user is within a low-speed section of the functional icon area 23, scroll operation may be performed at a low speed. This helps the user to recognize a function whose setting details differ from the initial values stored in the item initial value storage portion 1900.

In such a case, in a process specified by Step S200 in the flowchart of FIG. 13, the scroll screen control portion 1200 determines whether or not a functional icon 30 for a function whose setting details stored in the item setting details storage portion 1800 differ from the initial values stored in the item initial value storage portion 1900 is within a low-speed section, instead of determining whether or not a functional icon 30 identified by a related functional icon identifier stored in the related icon storage portion 1750 is within a low-speed section.

Another configuration is possible in which the scroll screen control portion 1200 determines whether or not a functional icon 30 identified by a related functional icon identifier stored in the related icon storage portion 1750, or, a functional icon 30 for a function having an item whose setting details stored in the item setting details storage portion 1800 differ from the initial values stored in the item initial value storage portion 1900 is within a low-speed section.

6) The user interface function of the embodiments may execute a computer program to implement the whole or a part of the individual elements shown in FIG. 5, or may implement the whole or a part of the individual elements shown in FIG. 5 in any other formats.

In the case of a computer program, a computer is preferably caused to load the computer program written onto a recording medium such as a memory card or a CD-ROM, and to execute the computer program. Alternatively, a computer is preferably caused to download a computer program via a network and to execute the computer program.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus having a plurality of functions, comprising:
   a scroll display portion that displays a scroll track and a slider, the scroll track being an image in which markers corresponding to the plurality of functions are successively placed, the slider being an image for specifying a partial area of the scroll track sequentially by moving along the scroll track;

an image display portion that displays functional images specified by the slider moved in response to user operation, the functional images being images representing the plurality of functions corresponding to the markers contained in the partial area of the scroll track;

a setting portion that receives setting item details for a function specified by one of the functional images selected by a user; and an extraction portion that extracts a function having the setting item details received by the setting portion that have been changed from initial values of setting item details for the function, wherein in order for a functional image to be scrolled for display in accordance with a movement of the slider, the image display portion displays the functional image for a first period of time when the functional image represents the function extracted by the extraction portion and for a second period of time when the functional image does not represent the function extracted by the extraction portion, wherein the first period is longer than the second period.

2. The image processing apparatus according to claim 1, wherein the extraction portion extracts a related function to the setting item details received by the setting portion.

3. The image processing apparatus according to claim 1, wherein the image display portion displays the functional images in such a manner that the functional images appear to move at a speed in accordance with a speed of a movement of the slider, and, in order for a functional image to be scrolled for display, the image display portion displays the functional image at a lower speed when the functional image represents the function extracted by the extraction portion than when the functional image does not represent the function extracted by the extraction portion.

4. The image processing apparatus according to claim 1, wherein the image display portion displays the functional images in such a manner that the functional images appear to move at a speed in accordance with a speed of a movement of the slider, and, in order for a functional image to be scrolled for display, the image display portion displays the functional image in such a manner that the functional image appears to stop at a predetermined position for a predetermined time when the functional image represents the function extracted by the extraction portion.

5. The image processing apparatus according to claim 1, further comprising an automatic change portion that, when the setting portion receives the setting item details for the function specified by the functional image selected by the user, changes automatically setting item details relating to a predetermined function other than the function specified by the functional image thus selected, wherein the extraction portion extracts, as a related function, the predetermined function of which the setting item details have been changed automatically.

6. The image processing apparatus according to claim 1, wherein the extraction portion extracts, as a related function, a function for a setting item that is in a restriction relationship with the setting item details received by the setting portion.

7. The image processing apparatus according to claim 1, wherein, when the setting portion receives setting item details for a function, the extraction portion extracts, as a related function, a function for a setting item that is presumed to be specified subsequently.

8. A method for displaying an interface screen used in an image processing apparatus having a plurality of functions, the method comprising:

a scroll display step of displaying a scroll track and a slider, the scroll track being an image in which markers corresponding to the plurality of functions are successively placed, the slider being an image for specifying a partial area of the scroll track sequentially by moving along the scroll track;

an image display step of displaying functional images specified by the slider moved in response to user operation, the functional images being images representing the plurality of functions corresponding to the markers that are specified by the slider and are contained in the partial area of the scroll track;

a setting step of receiving setting item details for a function specified by one of the functional image selected by a user; and an extraction step of extracting a function having the setting item details received in the setting step that have changed from initial values of setting item details for the function, wherein, in order for a functional image to be scrolled for display in accordance with a movement of the slider, the image display step includes displaying the functional image for a first period of time when the functional image represents the function extracted in the extraction step and for a second period of time when the functional image does not represent the function extracted in the extraction step, wherein the first period is longer than the second period.

9. The method according to claim 8, wherein the extraction step includes extracting a related function to the setting item details received in the setting step.

10. The method according to claim 8, wherein the image display step includes displaying the functional images in such a manner that the functional images appear to move at a speed in accordance with a speed of a movement of the slider, and, in order for a functional image to be scrolled for display, the image display step includes displaying the functional image at a lower speed when the functional image represents the function extracted in the extraction step than when the functional image does not represent the function extracted in the extraction step.

11. The method according to claim 8, wherein the image display step includes displaying the functional images in such a manner that the functional images appear to move at a speed in accordance with a speed of a movement of the slider, and, in order for a functional image to be scrolled for display, the image display step includes displaying the functional image in such a manner that the functional image appears to stop at a predetermined position for a predetermined time when the functional image represents the function extracted in the extraction step.

12. The method according to claim 8, further comprising an automatic change step of, when the setting item details for the function specified by the functional image selected by the user are received, changing automatically setting item details relating to a predetermined function other than the function specified by the functional image thus selected, wherein the extraction step includes extracting, as a related function, the predetermined function of which the setting item details have been changed automatically.

13. The method according to claim 8, wherein the extraction step includes extracting, as a related function, a function for a setting item that is in a restriction relationship with the setting item details received in the setting step.

14. The method according to claim 8, wherein the extraction step includes extracting, as a related function, a function for a setting item that is presumed to be specified subsequently when the setting item details for a function are received in the setting step.

15. A non-transitory computer-readable storage medium storing thereon a computer program used in an image processing apparatus that has a plurality of functions and displays an interface screen, the computer program causing the image forming apparatus to perform:
- a scroll display step of displaying a scroll track and a slider, the scroll track being an image in which markers corresponding to the plurality of functions are successively placed, the slider being an image for specifying a partial area of the scroll track sequentially by moving along the scroll track;
- an image display step of displaying functional images specified by the slider moved in response to user operation, the functional images being images representing the plurality of functions corresponding to the markers that are specified by the slider and are contained in the partial area of the scroll track;
- a setting step of receiving setting item details for a function specified by one of the functional image selected by a user; and
- an extraction step of extracting a function having the setting item details received in the setting step that have changed from initial values of setting item details for the function,
- wherein, in order for a functional image to be scrolled for display in accordance with a movement of the slider, the image display step includes displaying the functional image for a first period of time when the functional image represents the function extracted in the extraction step and for a second period of time when the functional image does not represent the function extracted in the extraction step, wherein the first period is longer than the second period.

16. The non-transitory computer-readable storage medium according to claim 15, wherein the extraction step includes extracting a related function to the setting item details received in the setting step.

17. The non-transitory computer-readable storage medium according to claim 15, wherein the image display step includes displaying the functional images in such a manner that the functional images appear to move at a speed in accordance with a speed of a movement of the slider, and, in order for a functional image to be scrolled for display, the image display step includes displaying the functional image at a lower speed when the functional image represents the function extracted in the extraction step than when the functional image does not represent the function extracted in the extraction step.

18. The non-transitory computer-readable storage medium according to claim 15, wherein the image display step includes displaying the functional images in such a manner that the functional images appear to move at a speed in accordance with a speed of a movement of the slider, and, in order for a functional image to be scrolled for display, the image display step includes displaying the functional image in such a manner that the functional image appears to stop at a predetermined position for a predetermined time when the functional image represents the function extracted in the extraction step.

19. The non-transitory computer-readable storage medium according to claim 15, further comprising an automatic change step of, when the setting item details for the function specified by the functional image selected by the user are received, changing automatically setting item details relating to a predetermined function other than the function specified by the functional image thus selected,
- wherein the extraction step includes extracting, as a related function, the predetermined function of which the setting item details have been changed automatically.

20. The non-transitory computer-readable storage medium according to claim 15, wherein the extraction step includes extracting, as a related function, a function for a setting item that is in a restriction relationship with the setting item details received in the setting step.

21. The non-transitory computer-readable storage medium according to claim 15, wherein the extraction step includes extracting, as a related function, a function for a setting item that is presumed to be specified subsequently when the setting item details for a function are received in the setting step.

22. The image processing apparatus according to claim 2, wherein the image display portion displays a marker corresponding to the related function extracted in the scroll track in a manner to be distinguished from a marker not corresponding to the related function.

23. The method according to claim 9, wherein the image display step includes displaying a marker corresponding to the related function extracted in the scroll track in a manner to be distinguished from a marker not corresponding to the related function.

24. The non-transitory computer-readable storage medium according to claim 16, wherein the image display step includes displaying a marker corresponding to the related function extracted in the scroll track in a manner to be distinguished from a marker not corresponding to the related function.

* * * * *